US006285340B1

(12) United States Patent
Park et al.

(10) Patent No.: US 6,285,340 B1
(45) Date of Patent: Sep. 4, 2001

(54) HELICAL ANTENNA FOR PORTABLE PHONES AND MANUFACTURING METHOD THEREOF

(75) Inventors: Duck Jae Park, Seoul; Jong Cheol Yun, Inchon; Ki Duk Koo, Seoul; Kyu Bok Lee, Songnam; Jae Suk Sung, Seoul, all of (KR)

(73) Assignee: Ace Technology, Seoul (KR)

( * ) Notice: Subject to any disclaimer, the term of this patent is extended or adjusted under 35 U.S.C. 154(b) by 0 days.

(21) Appl. No.: 09/328,502

(22) Filed: Jun. 9, 1999

(30) Foreign Application Priority Data

| | | |
|---|---|---|
| Sep. 7, 1998 | (KR) | 98-36835 |
| Sep. 7, 1998 | (KR) | 98-36836 |
| Sep. 11, 1998 | (KR) | 98-37456 |
| Sep. 11, 1998 | (KR) | 98-37457 |
| Sep. 11, 1998 | (KR) | 98-37458 |

(51) Int. Cl.[7] ..... H01G 1/36
(52) U.S. Cl. ..... 343/895; 343/702; 343/901
(58) Field of Search ..... 343/702, 895, 343/715, 900, 901; H01Q 1/36

(56) References Cited

U.S. PATENT DOCUMENTS

| | | | | |
|---|---|---|---|---|
| 5,151,711 | * | 9/1992 | Taguchi | 343/715 |
| 5,317,325 | | 5/1994 | Bottomley | 343/702 |
| 5,353,036 | | 10/1994 | Baldry | 343/702 |
| 5,406,693 | * | 4/1995 | Egashira et al. | 29/600 |
| 5,467,096 | | 11/1995 | Takamoro et al. | 343/702 |
| 5,504,494 | | 4/1996 | Chatzipetros et al. | 343/702 |
| 5,546,094 | | 8/1996 | Egashira | 343/702 |
| 5,594,459 | | 1/1997 | Hirota | 343/749 |
| 5,606,327 | | 2/1997 | Elliot et al. | 343/702 |
| 5,650,789 | | 7/1997 | Elliott et al. | 343/702 |
| 5,661,496 | | 8/1997 | Baek et al. | 343/702 |
| 5,764,191 | | 6/1998 | Tsuda | 343/702 |
| 5,914,697 | * | 6/1999 | Seki | 343/895 |
| 6,091,369 | | 7/2000 | Baek et al. | 343/702 |

* cited by examiner

*Primary Examiner*—Tan Ho
*Assistant Examiner*—Shih-Chao Chen
(74) *Attorney, Agent, or Firm*—Finnegan, Henderson, Farabow, Garrett & Dunner, L.L.P.

(57) ABSTRACT

A helical antenna having a simple structure and being made of cheap conductor to reduce the manufacturing cost, and a manufacturing method thereof. A helical antenna comprises a dielectric core, a conductive strip, a feeding conductor, and an external circuit. The dielectric core has a substantially cylindrical shape with an outer circumferential surface on which a spiral groove is formed. The conductive strip is deposited on the groove of the dielectric core. The feeding conductor is placed under the dielectric core and provides an electrical connection between the conductive strip and an external circuit. The antenna cover encloses the dielectric core and the feeding conductor.

5 Claims, 25 Drawing Sheets

HELICAL ANTENNA FOR PORTABLE PHONES AND MANUFACTURING METHOD THEREOF

BACKGROUND OF THE INVENTION

1. Field of the Invention

The present invention relates to an antenna, and more particularly, to an antenna for use in a portable telephone such as a cellular phone and a manufacturing method thereof.

2. Description of the Related Art

Portable phones are getting smaller in size due to the developments in battery technology and the integration of internal circuits thereof into chips. In addition, antennas employed in the portable phones are getting smaller along with the main body of the phones. Although the antenna of the portable phone is getting smaller, it is necessary that it still exhibit enough sensitivity to operate properly. In order to minimize its size while maintaining the sensitivity thereof, the antenna assembly for the portable phone typically employs a helical antenna incorporated with a whip antenna.

FIGS. 1 and 2 illustrate an example of a conventional antenna assembly which employs a helical antenna and a whip antenna, in an extended position and a retracted position, respectively. In the antenna assembly of FIGS. 1 and 2, the helical antenna includes a helical element 10, a first metal fitting 12, a second metal fitting 14, and a first antenna cover 16. The helical element 10 is usually made of an elastic metal and has an electrical length of $\lambda/4$. The first metal fitting 12 has an aperture passing through its center vertically and is threaded on its outer surface. The second metal fitting 14 provides an electrical connection between the helical element 10 and the first metal fitting 12. The first antenna cover 16 encloses the helical element 10 to prevent the performance of the helical element 10 from being deteriorated due to deformation, damage, or oxidation thereof caused by external contact or impact. Meanwhile, the whip antenna includes an antenna rod 20, a second cover 22, and a conductive stopper 24. The antenna rod 20 has an electrical length of $\lambda 4$ and operates as a monopole antenna. The second cover 22, which is made of a nonconductive plastic material, encloses the antenna rod 20 to protect it from external contact. The stopper 24 is attached to the bottom end of the antenna rod 20. In FIGS. 1 and 2, reference numeral 36 denotes a housing body of a portable phone.

In such an antenna assembly, the whip antenna is installed capable of upward and downward movement. When a user extends the whip antenna by pulling a knob 26 installed at the upper end thereof as show in FIG. 1, the power from a signal processing circuit 30 inside the phone is provided to the antenna rod 20 via an antenna clip 32, a housing fitting 34, and the stopper 24, and simultaneously to the helical element 10 via the first metal fitting 12 and the second metal fitting 14. In this operation mode, the whip antenna mainly operates as a monopole antenna, and the helical antenna operates as an accessory of the whip antenna. Meanwhile, when the antenna is retracted into the housing body as shown in FIG. 2, power from the signal processing circuit 30 is provided only to the helical element 10 since the stopper 24 is separated from the housing fitting 34 and the second metal fitting 12. Therefore, only the helical antenna receives or transmits signals.

Typically, the helical element of the antenna assembly described above is manufactured by winding an elastic metal wire over a dielectric such as polyvinyl chloride (PVC). However, this method of manufacture is quite costly because the elastic metal for the helical element is expensive as compared with a common material such as copper. Meanwhile, a metal wire used for the helical element is required to be highly oxidation-resistant so that the helical element is resistant from oxidization inside the antenna cover. To solve the oxidation problem, the outer surface of the metal wire may be coated with a plastic or a polymer. However, an accurate coating of the outer surface of the metal wire requires several additional processing steps. These additional processing steps significantly decrease the efficiency of mass-production of the antenna. Furthermore, the conventional helical antenna may be deformed or lose a required antenna characteristics when it experiences a strong impact even though it is protected by the antenna cover.

SUMMARY OF THE INVENTION

To solve the above problems, one object of the present invention is to provide a helical antenna with a structure simple enough to increase the efficiency of mass-production thereof. Another object of the present invention is to provide a conductor made of a cheap conducting material in order to reduce the manufacturing cost, and to significantly reduce the size of the antenna while maintaining the performance thereof.

Another object of the present invention is to provide a method of manufacturing a helical antenna having characteristics described above, which is appropriate for mass-production of the antenna.

According to an aspect of the present invention to achieve one of the above objects, a helical antenna comprises a dielectric core, a conductive strip, a feeding conductor, and an external circuit. The dielectric core has a substantially cylindrical shape with an outer circumferential surface on which a spiral groove is formed. The conductive strip is deposited on the spiral groove of the dielectric core. The feeding conductor is placed under the dielectric core and provides an electrical connection between the conductive strip and an external circuit. The antenna cover encloses the dielectric core and the feeding conductor.

According to another aspect of the present invention to achieve one of the above objects, a dual band helical antenna operable at two different frequencies comprises a first and second dielectric cores, a first and a second conductive strips, a feeding conductor, and an antenna cover. The first dielectric core has a substantially cylindrical shape with an outer circumferential surface on which a first spiral groove is formed. The first conductive strip is deposited on the first spiral groove and has a length of one-fourth of a first wavelength. The second dielectric core is positioned under the first dielectric core and has a substantially cylindrical shape with an outer circumferential surface on which a second spiral groove is formed. The second conductive strip is deposited on the second spiral groove of the second dielectric core and electrically connected to the first conductive strip, and has a length of one-fourth of a second wavelength. The feeding conductor is placed under the second dielectric core to provide an electrical connection between the second conductive strip and an external circuit. The antenna cover encloses the first and the second dielectric cores and the feeding conductor.

In a method of manufacturing a helical antenna to achieve another one of the above objects, a dielectric core having a substantially circular shape is provided, and a spiral groove is formed on an outer circumferential surface of the dielectric core. A conductive strip is deposited along the spiral groove of the dielectric core. A feeding conductor is provided so as to be electrically connected to the conductive strip at one end of the dielectric core. Finally, an antenna cover is enclosed cover over the dielectric core and the feeding conductor.

The helical antenna according to the present invention has a simple structure that can be easily reproduced. This simple structure is suitable for mass-production, thus the manufacturing cost thereof can be reduced. Additionally, the simple structure consistent with the present invention allows for the use of copper as a conductor in a helical antenna. Copper is cheaper than conventional materials used as a conductor in the helical element, thus the manufacturing cost can be reduced further. Also, the stability of the antenna is improved since the helical antenna is implemented by a conductive strip formed onto a dielectric which rarely is affected by an external touch or impact to be deformed or oxidized. Furthermore, the size of the antenna is reduced compared with conventional products.

In particular, a dual band helical antenna according to the present invention, in which two conductive strips are connected to each other in series, can be used in two different frequency bands without any modification. Thus, a phone manufacturing company producing two kinds of phones each of which operates at different frequency need not be equipped with different kinds of antennas each for different kinds of the phones.

BRIEF DESCRIPTION OF THE DRAWINGS

The above objectives and advantages of the present invention will become more apparent by describing in detail preferred embodiments thereof with reference to the attached drawings in which.

DESCRIPTION OF THE PREFERRED EMBODIMENTS

Figure 1:
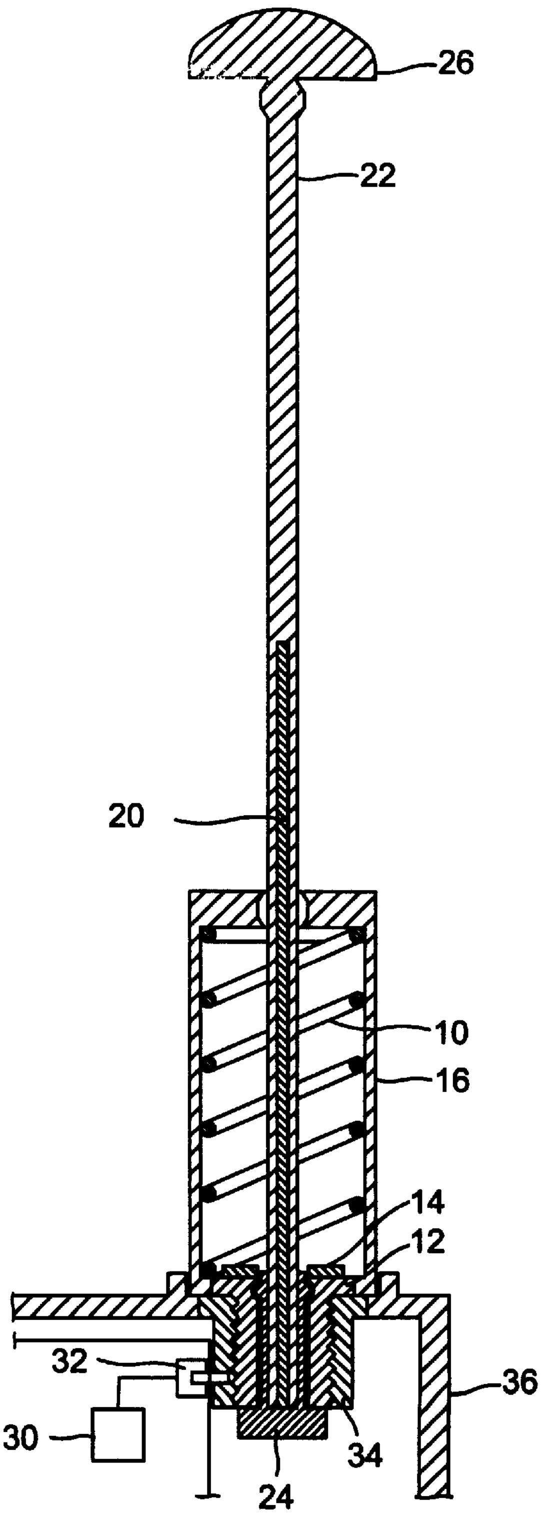
FIG. 1 (PRIOR ART)
FIG. 1 is a cross-sectional view illustrating a conventional antenna assembly in an extended position.
Figure 2:
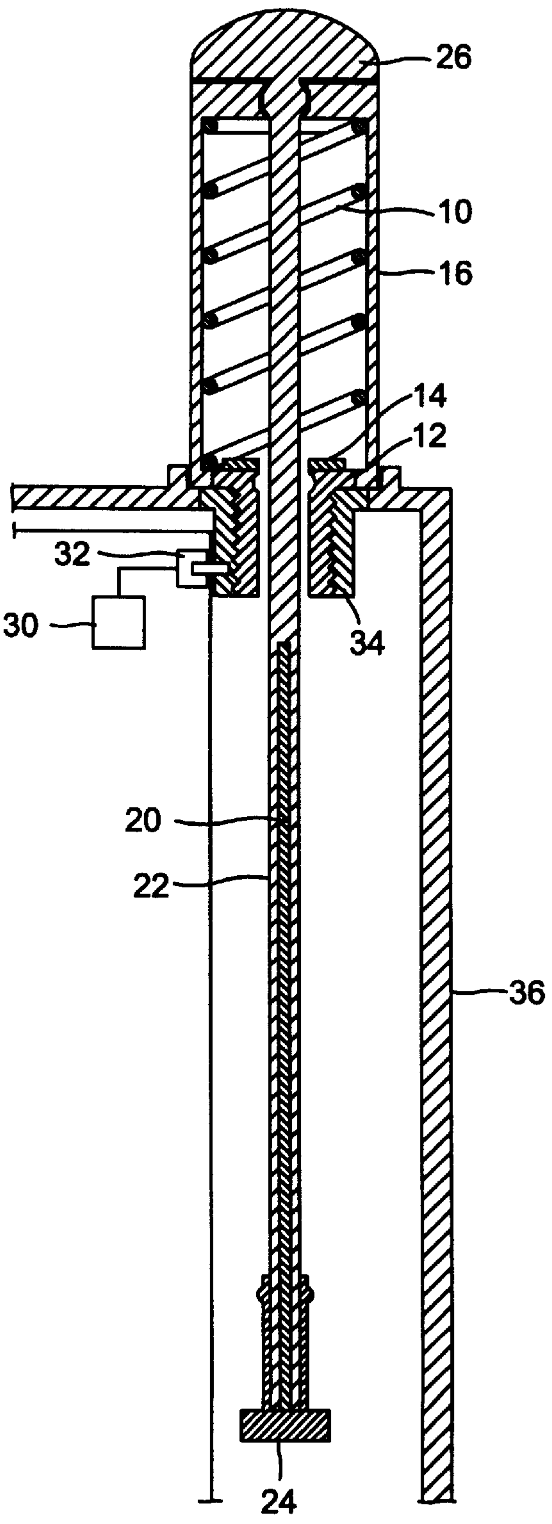
FIG. 2 (PRIOR ART)
FIG. 2 is a cross-sectional view illustrating a conventional antenna assembly in a retracted position.
Figure 3:
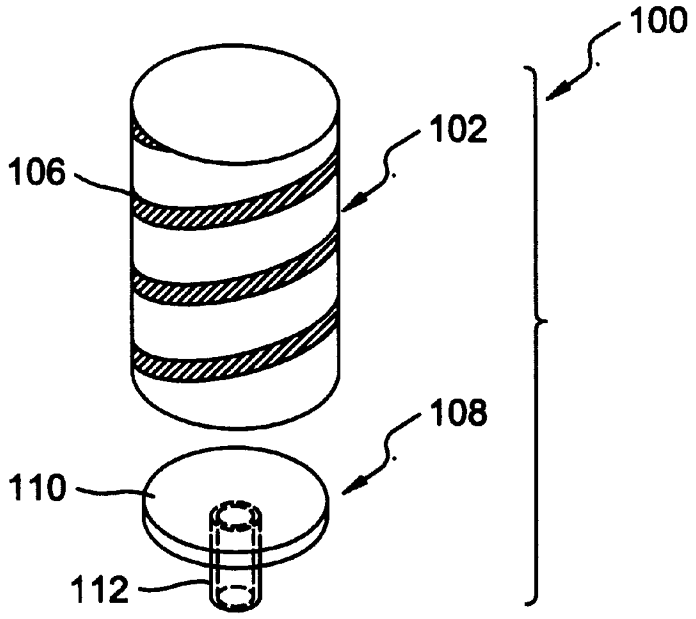
FIG. 3 is an exploded perspective view illustrating an embodiment of a helical antenna according to the present invention.
Figure 4:
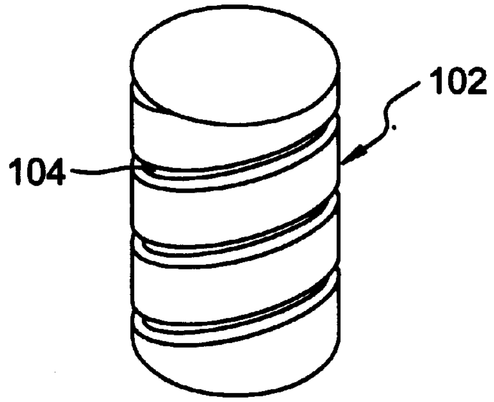
FIG. 4 is a perspective view illustrating a dielectric core of the helical antenna of FIG. 3.

Referring to FIG. 3, an embodiment of a helical antenna according to the present invention includes a dielectric core 102, a conductive strip 106 formed on the outer circumferential surface of the dielectric core 102, and a feeding conductor 108 for providing an electrical connection between a signal processing circuit in the phone and the conductive strip 106. As shown in FIG. 4, the dielectric core 102 has a cylindrical shape and a spiral groove 104 is formed on its outer circumferential surface. According to a preferred embodiment of the present invention, the dielectric core 102 is made by cutting and grooving a ceramic material. The conductive strip 106 is formed by plating copper in the groove 104 of the dielectric core 102 and has an electrical length of $\lambda/4$. Here, the formation of the conductive strip 106 can be compared to winding of a coil in a conventional helical antenna. The feeding conductor 108 includes a flat flange 110 and a cylindrical sleeve 112 extending downward from the bottom surface of the flange 110. Hereinafter, a structure of the dielectric core combined with the conductive strip is referred to as a “helical element.”

When the helical antenna having such a configuration is employed in an appliance such as a portable phone, a plastic antenna cover surrounds the dielectric core 102 and the feeding conductor 108 in a state where the conductive strip 106 is stuck fast to the flange 110 of the feeding conductor 108 at the bottom end of the dielectric core 102. Thus, the conductive strip 106 can radiate radio waves to the outer space according to a current signal fed through the feeding conductor 108 and provide a received radio frequency signal to the signal processing circuit via the feeding conductor 108.

Figure 5:
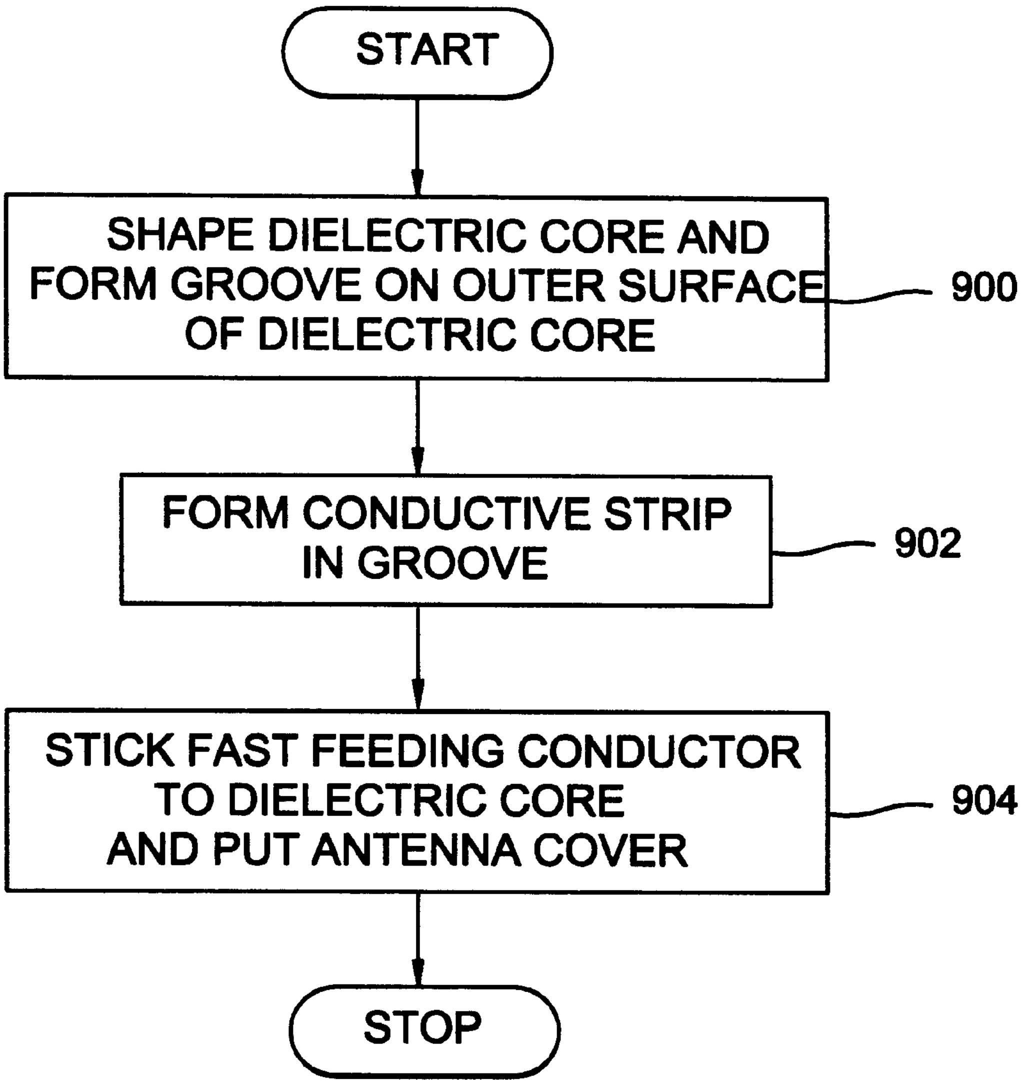
FIG. 5 is a flowchart illustrating a method of manufacturing the helical antenna of FIG. 3.

FIG. 5 illustrates a method of manufacturing the helical antenna of FIG. 3. First, the dielectric core 102 is shaped using a cutting machine such as a numerically-controlled lathe or a milling machine in step 900. Here, the width and depth of the groove 104 of the dielectric core 102 are determined based on the frequency used by the appliance adopting an antenna. In particular, it is preferable that the depth of the groove 104 has an order comparable with a skin depth determined by the frequency and the electric conductivity of the conductive strip. Generally, the skin depth is not so high for the frequency band of a portable phone, that the groove 104 need not be formed deeply.

In step 902, the conductive strip 106 is plated on the groove 104 of the dielectric core 102. In a preferred embodiment of the present invention, a brush plating method is employed, in which only a desired portion of a surface is electroplated without using a sedimentation tank. However, the present invention is not limited to the brush plating technique, rather the plating process may be carried out by any other method. For example, in an alternative of the present embodiment, the entire outer circumferential surface of the dielectric core 102 is plated by being deposited in a plating solution, and then a plated metal portion formed on the dielectric core 102 other than the groove 104 is etched out. Alternatively, the groove 104 may be plated while the surface of the dielectric core 102 other than the groove 104 is masked. Further, the formation of the conductive strip may employ a coating process rather than the plating process. Also, in a yet another embodiment of the present invention, the conductive strip 106 may coated by a physical vapor deposition (PVD) or a chemical vapor deposition (CVD) process.

In step 904, the flange 110 of the feeding conductor 108 is stuck fast to the bottom surface of the dielectric core 102, and the antenna cover is put outside the dielectric core 102 and the feeding conductor 108. With the antenna cover put, the helical antenna is installed in the appliance.

Figure 6:
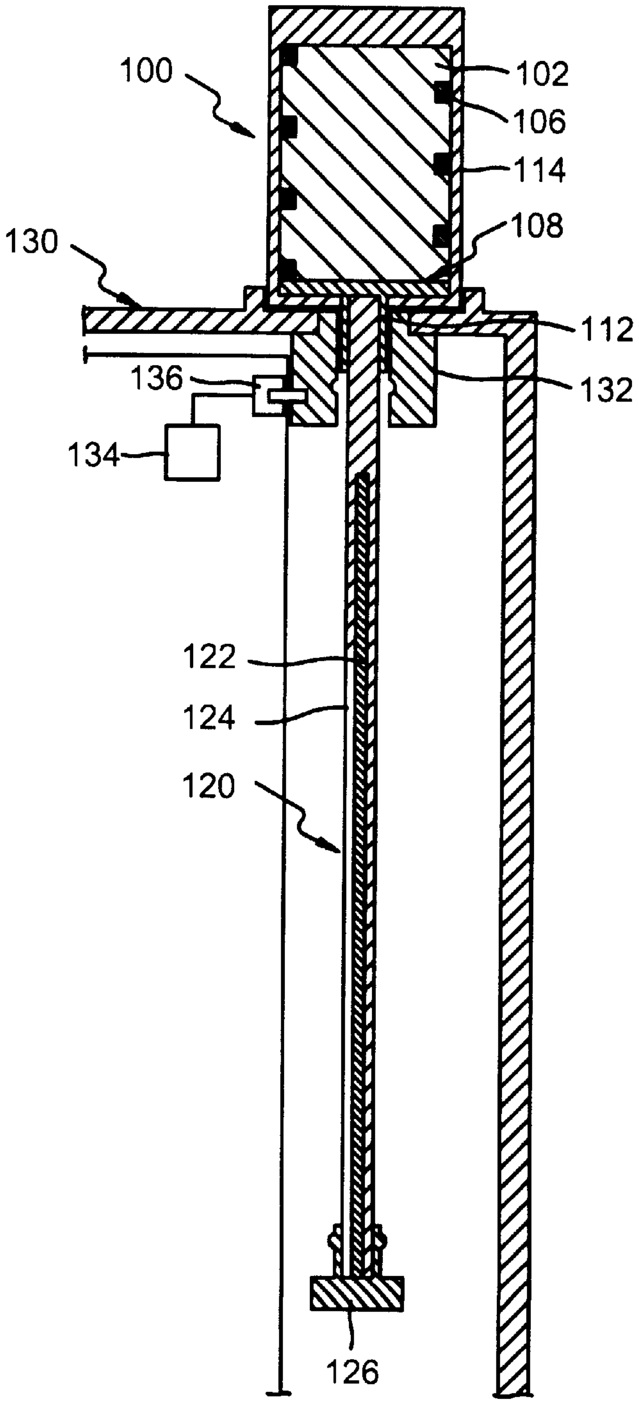
FIG. 6 is a cross-sectional view illustrating an antenna assembly, in a retracted position, which employs the helical antenna of FIG. 3.
Figure 7:
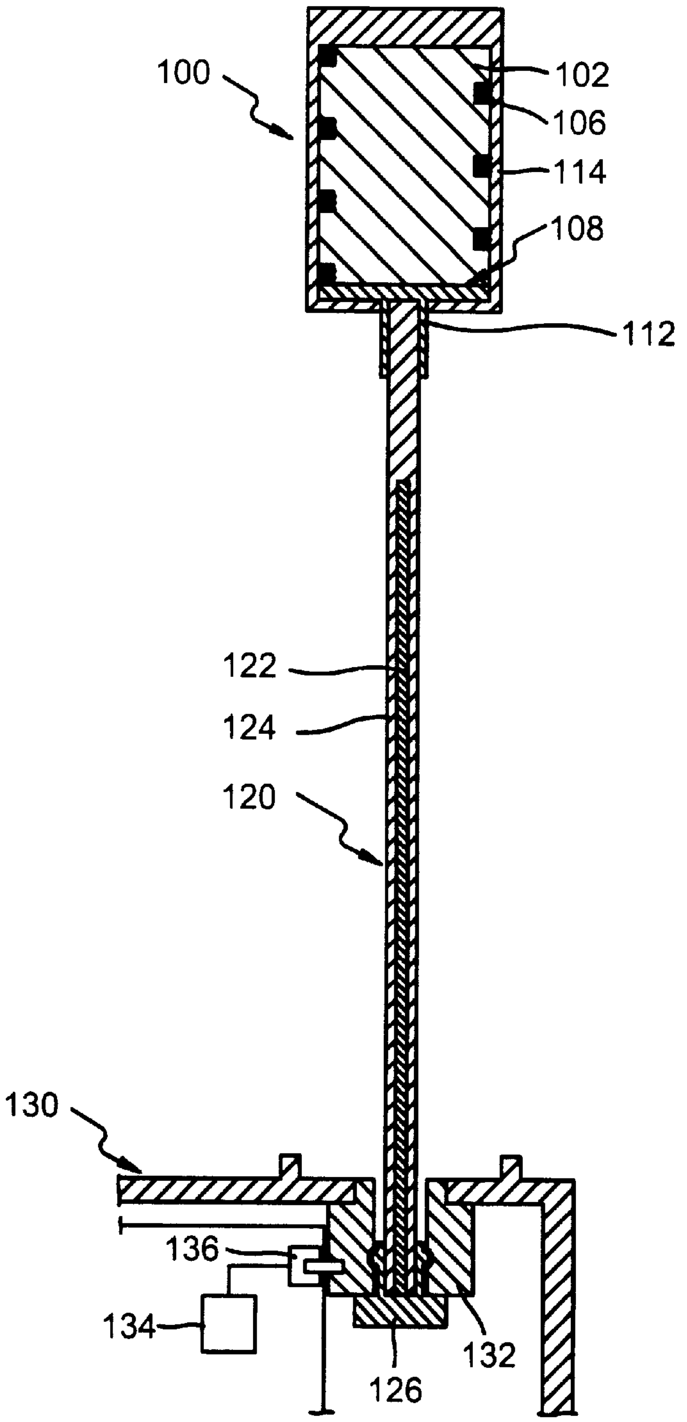
FIG. 7 is a cross-sectional view illustrating an antenna assembly, in an extended position, which employs the helical antenna of FIG. 3.

FIGS. 6 and 7 illustrate an example of an antenna assembly including the helical antenna of FIG. 3 which is installed in a portable phone. The antenna assembly shown in FIGS. 6 and 7 includes a helical antenna 100 and a whip antenna 120. As described above, a helical element constituting the helical antenna 100 is implemented by the conductive strip 106 plated on the outer circumferential surface of the dielectric core 102. The feeding conductor 108 is installed under the bottom surface of the dielectric core 102. A plastic antenna cover 114 surrounds the helical element 10 to protect the helical element 10 from external contact or impact.

The whip antenna 120 includes an antenna rod 122, a second antenna cover 124, and a conductive stopper 126. The antenna rod 122 has an electrical length of λ/4 and operates as a monopole antenna. The second antenna cover 124, which is made of nonconductive plastic material, encloses the antenna rod 122 to protect it from the external touch or impact. The stopper 126 is attached to the bottom end of the antenna rod 122 in such a manner that the antenna rod 122 and the stopper 126 are electrically connected to each other.

The helical antenna 100 and the whip antenna 120 are installed onto the phone as follows. First, the helical antenna 100 is combined to the upper end of the whip antenna 120 by forcibly fitting the sleeve 112 of the feeding conductor 110 on the upper end of the whip antenna 120. On the other hand, a hole is formed through the upper portion of the housing 130 of the phone, and a ring-shaped connector 132 for electrically connecting the antenna assembly to a signal processing circuit 134 of the phone is installed inside the hole. Thus, the connector 132 can be forcibly fit into the hole or housed by use of an adhesive. Alternatively, screw patterns may be formed on the inner wall of the hole of the housing and the outer circumferential surface of the connector 132, so that the two screwed patterns engage each other. The antenna assembly is installed so as to be movable upward and downward inside the hole penetrating the center of the connecter 132. Meanwhile, in order to ensure the electrical contact of the sleeve 112 and the connector 132 in a retracted position, a snap-in protrusion and a snap-in recess are formed on the outer surface of the stopper 126 and the inner surface of the connector hole, respectively. Alternatively, a plate spring may be additionally installed on the inner side of the connector 132 instead of the snap-in recess and the snap-in protrusion.

The antenna assembly of FIGS. 6 and 7 operates as follows. When the antenna assembly is in its retracted position as shown in FIG. 6, the stopper 126 is electrically isolated from the connector 132 so that no signal is transferred between the signal processing circuit 134 inside the phone and the whip antenna 120. Therefore, the whip antenna 120 has no effect on the antenna characteristics in such a position. At this time, however, the helical antenna 100 can exchange signals with the signal processing circuit 134 since the sleeve 112 of the feeding conductor 108 is electrically connected to the connector 132. Thus, the power from the signal processing circuit 134 is provided to the conductive strip 106 of the helical antenna via the antenna clip 136, the connector 132, and the feeding conductor 108 and is radiated as a radio wave. Also, a radio frequency (RF) signal received by the conductive strip 106 is provided to the signal processing circuit 134 via the feeding conductor 108, the connector 132, and the antenna clip 136.

When the antenna assembly is extended as shown in FIG. 7 by pulling the helical antenna 100 at the upper end of the antenna assembly, the sleeve 112 of the feeding conductor 108 is isolated from the connector 132. Thus, the helical antenna 100 has no effect on the antenna characteristics. In this case, however, the whip antenna 120 is electrically connected to the signal processing circuit 134 via the antenna clip 136, the connector 132, and the stopper 126, and operates as a single monopole antenna. The power from the signal processing circuit 134 of the phone is provided to the whip antenna and is radiated as a radio wave. Also, the RF signal received by the whip antenna 120 is provided to the signal processing circuit 134.

Meanwhile, in an alternative embodiment of the helical antenna of FIG. 3, the sleeve 112 may not be provided to the feeding conductor 108. In such an embodiment, the connector 132 is manufactured so that its upper area facing the flange 110 of the feeding conductor is sufficiently wide. Accordingly, when the antenna assembly is in its retracted position as shown in FIG. 6, signals are transferred between the flange 110 of the helical antenna and the connector 132 through electromagnetic coupling.

Figure 8:
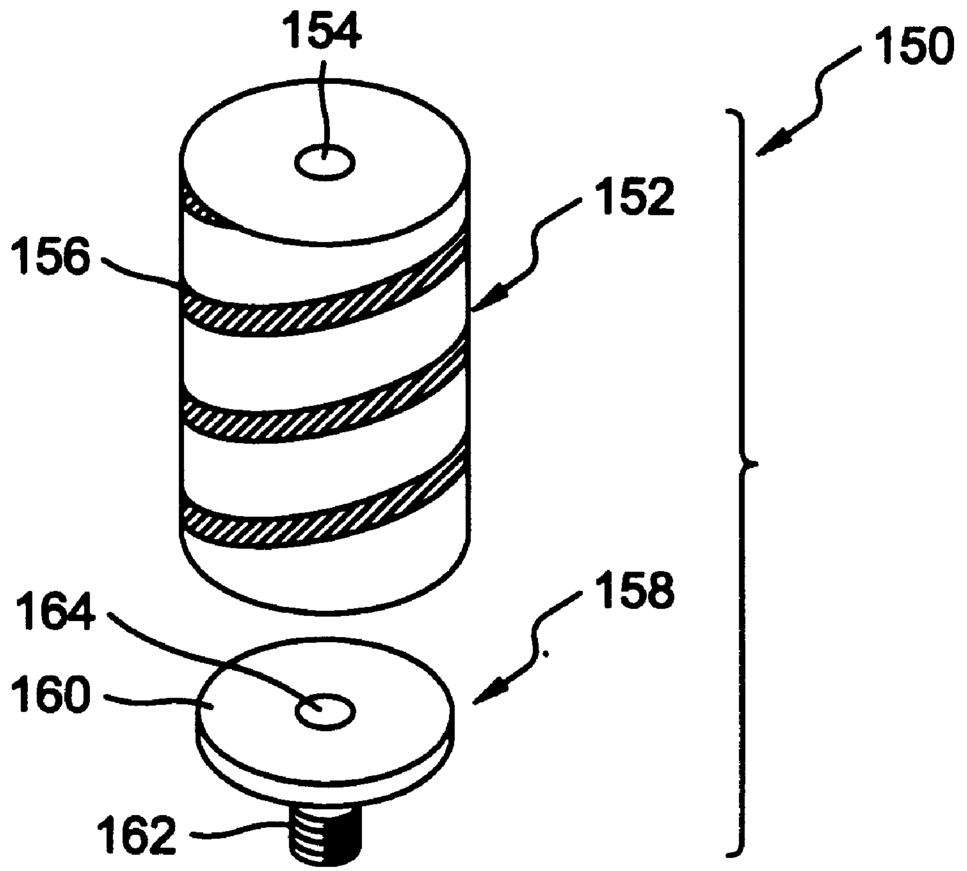
FIG. 8 is an exploded perspective view illustrating another embodiment of the helical antenna according to the present invention.

FIG. 8 illustrates another embodiment of the helical antenna according to the present invention. The helical antenna 150 of FIG. 8 is similar in structure to that shown in FIG. 3, and includes a dielectric core 152, a conductive strip 156 coated or plated on the dielectric core 152, and a feeding conductor 158 for providing an electrical connection between the conductive strip 156 and a signal processing circuit in the phone. The dielectric core 152, which has a cylindrical shape, has an aperture 154 penetrating axially through the dielectric core 152. Also, a spiral groove is formed on the outer circumferential surface of the dielectric core 152. The conductive strip 156 is formed by plating the groove of the dielectric core 152 with copper, and has an electrical length of λ/4. The feeding conductor 158 includes a flat flange 160 and a sleeve 162 extending downward from the bottom surface of the flange 160. An aperture 164 is formed through the feeding conductor 158. The aperture 164 penetrates the center of the flange 160 and the axis center of the sleeve 162 and has the same diameter as the aperture 154 of the dielectric core 152. A screw thread is formed on the outer circumferential surface of the sleeve 162. While being assembled, the flange 160 of the feeding conductor 158 is being stuck fast to the bottom of the dielectric core 152, and a plastic antenna cover is put on the dielectric core 162 and the feeding conductor 158.

Figure 9:
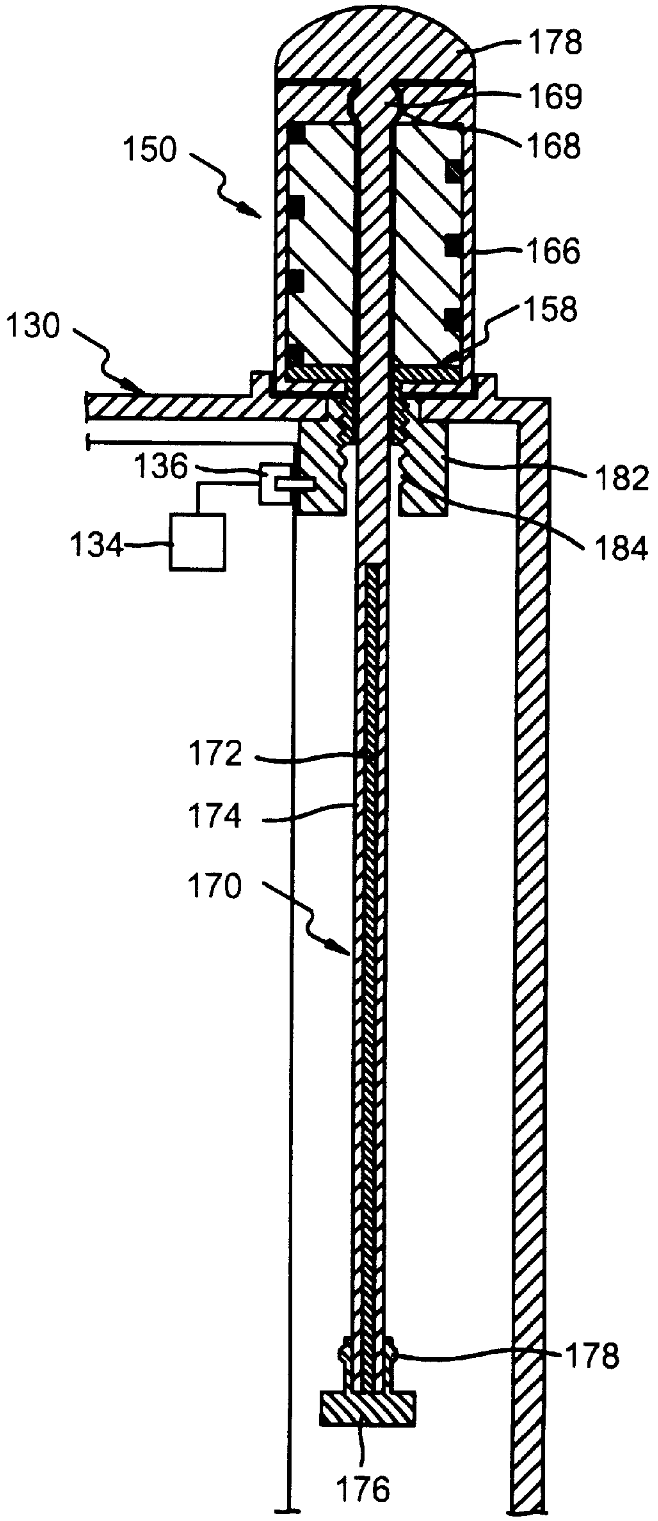
FIG. 9 is a cross-sectional view illustrating an antenna assembly, in a retracted position, which employs the helical antenna of FIG. 8.
Figure 10:
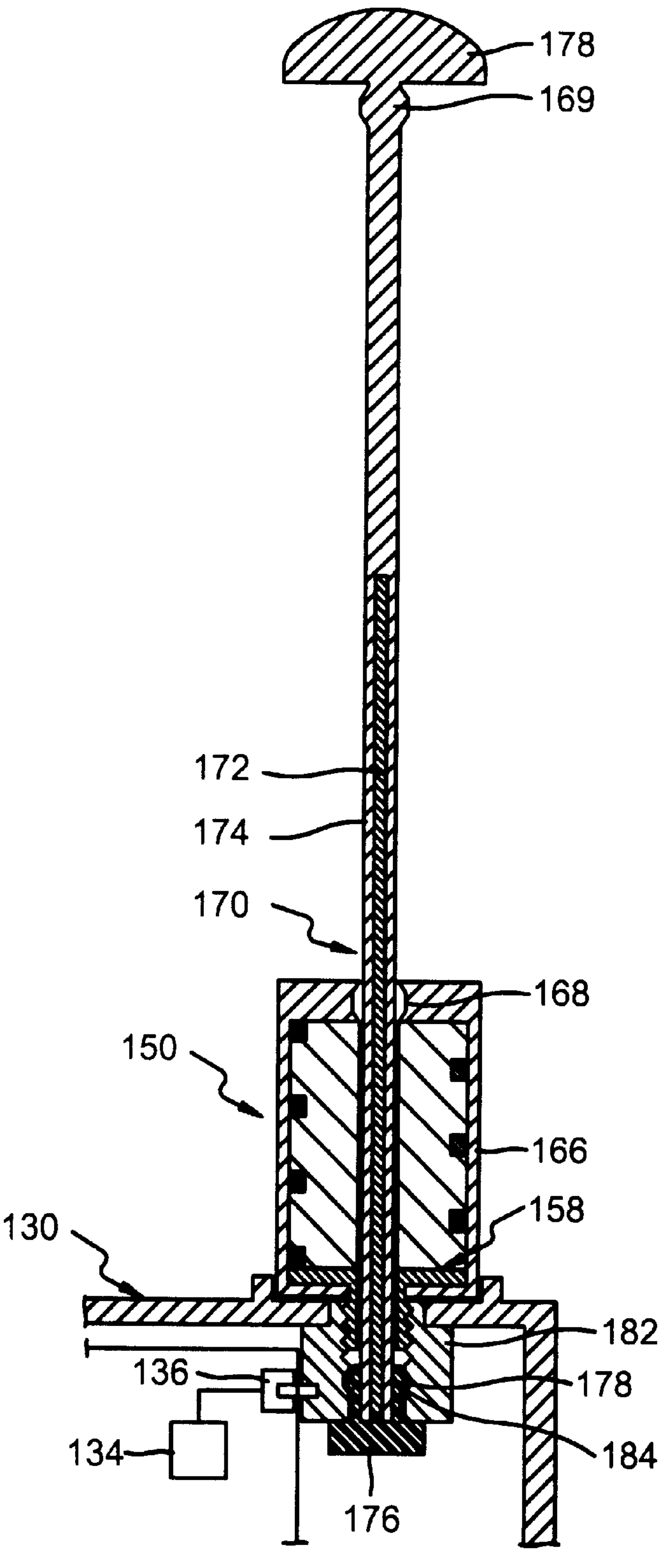
FIG. 10 is a cross-sectional view illustrating an antenna assembly, in an extended position, which employs the helical antenna of FIG. 8.

FIGS. 9 and 10 illustrate an example of an antenna assembly including the helical antenna of FIG. 8 which is installed in a portable phone. The antenna assembly shown in FIGS. 9 and 10 includes a helical antenna 150 and a whip antenna 170. An aperture 184 is formed through the upper portion of the housing 130 of the phone, and a ring-shaped connector 182 for electrically connecting the antenna assembly to the signal processing circuit in the phone is installed inside the aperture. Also, the inner circumferential surface of the connector 182 is threaded so as to engage the antenna assembly. The connector 182 can be forcibly fit into the aperture 184 or mounted by use of an adhesive. Alternatively, threaded patterns may be formed on the inner wall of the aperture 184 of the housing and the outer circumferential surface of the connector 182, so that the two threaded patterns engage each other. The helical antenna 150 is installed on and fixed to the phone by engaging the threaded pattern of the sleeve 162 and that of the connector 182.

The whip antenna 170 includes an antenna rod 172, an antenna cover 124, and a conductive stopper 176. The antenna rod 172 has an electrical length of λ/4 and operates as a monopole antenna. The antenna cover 174, which is made of nonconductive plastic material, encloses the antenna rod 172 to protect it from the external contact or impact. The stopper 176 is attached to the bottom end of the antenna rod 172. In a preferred embodiment of the present invention, the antenna rod 172 and the stopper 176 are electrically connected to each other. A knob 178 for facilitating extension and retraction of the whip antenna 170 is provided on the upper end of the whip antenna 170. The whip antenna 170 is installed to provide upward and downward movement within the apertures 154 and 184 penetrating the dielectric core 152 of the helical antenna and within the connector 182.

In order to stabilize the whip antenna 170 when it is in its retracted position, a concave snap-in recess 168 is formed on the inner side of the antenna cover 166 of the helical antenna, and a snap-in protrusion 169 is formed on the outer circumferential surface of the antenna cover 174 of the whip antenna opposite to the snap-in recess 168. Similarly, in order to stabilize the whip antenna 170 when it is in its extended position, a snap-in recess 184 is formed on the inner side of the connector 182, and a snap-in protrusion 178 is formed on the outer circumferential surface of the stopper 176 opposite to the snap-in recess 184.

The antenna assembly of FIGS. 9 and 10 operates as follows. When the antenna assembly is in its retracted position as shown in FIG. 9, the stopper 176 is electrically isolated from the connector 184 so that no signal is transferred between the signal processing circuit 134 and the whip antenna 170. Therefore, only the helical antenna 150 has effect on the antenna characteristics in such a position. The power from the signal processing circuit 134 is provided to the conductive strip 156 of the helical antenna via the antenna clip 136, the connector 182, and the feeding conductor 158 and is radiated as a radio wave. Also, a RF signal received by the conductive strip 156 is provided to the signal processing circuit 134 via the feeding conductor 158, the connector 182, and the antenna clip 136.

When the antenna assembly is in its extended position as shown in FIG. 10, the stopper 176 is electrically connected to the connector 184, so that the whip antenna 170 operates together with the helical antenna 150. At this time, the whip antenna 170 mainly operates as a monopole antenna to transmit and receive signals, and the helical antenna 150 is operable as an accessory of the whip antenna 170.

Figure 11:
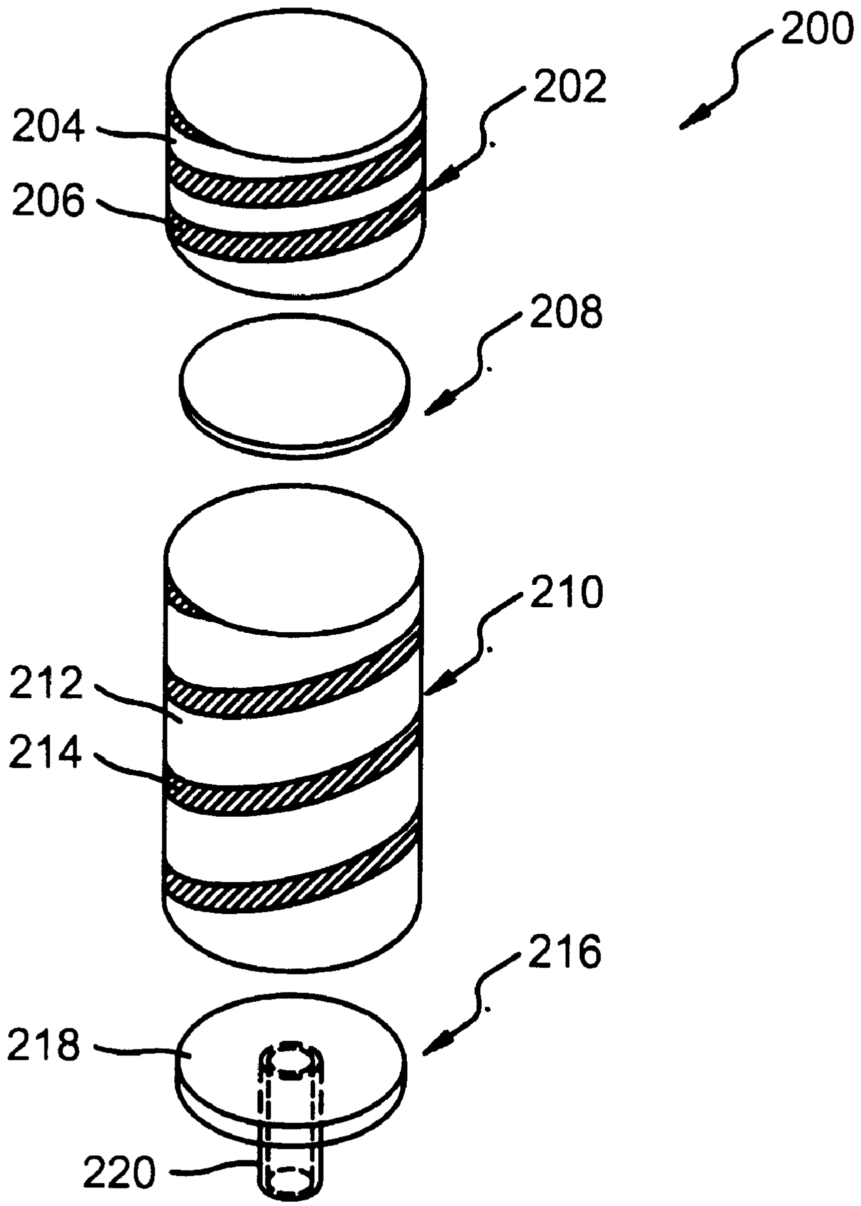
FIG. 11 is an exploded perspective view illustrating yet another embodiment of the helical antenna according to the present invention, which operates as a dual band antenna.

FIG. 11 illustrates another embodiment of the helical antenna according to the present invention. The helical antenna 200 of FIG. 11, which is a dual band antenna capable of operating in two different frequency bands, has a structure in which two helical elements 202 and 210 are connected in series. Thus, the helical antenna 200 can be adopted to either a portable phone operating at a frequency $f_1$ or a phone operating at another frequency $f_2$ without any structural modification. For example, the antenna according to the present embodiment can be employed in both a personal communications service (PCS) phone operating at the frequency $f_1$ and a cellular phone operating at the frequency $f_2$.

The helical antenna 200 includes a first and second helical elements 202 and 210, an intermediate conductor 208, and a feeding conductor 216. The intermediate conductor 208 electrically connects the first and second helical elements 202 and 210 to each other. The feeding conductor 216 provides an electrical connection between the signal processing circuit in the phone and the first and second helical elements 202 and 210.

The first helical element 202 includes a first dielectric core 204 and a first conductive strip 206 formed on the first dielectric core 204. In a preferred embodiment, the first dielectric core 204 has a cylindrical shape, and a spiral groove is formed on the outer circumferential surface thereof. The first conductive strip 206 is formed by plating or coating the groove of the first dielectric core 204 with copper and has an electrical length of $\lambda_1/4$, where $\lambda_1=c/f_1$ and c denotes the speed of light. The width and thickness of the first conductive strip 206 are determined based on the frequency $f_1$ and the electric conductivity of the material constituting the first conductive strip 206, e.g., copper.

The second helical element 210 includes a second dielectric core 212 and a second conductive strip 214 formed on the second dielectric core 212. In a preferred embodiment, the second dielectric core 212 has a cylindrical shape and a spiral groove is formed on the outer circumferential surface thereof. The second conductive strip 214 is formed by plating or coating the groove of the second dielectric core 212 with copper and has an electrical length of $\lambda_2/4$, where $\lambda_2=c/f_2$. The width and thickness of the second conductive strip 214 are determined based on the frequency $f_2$ and the electric conductivity of the material constituting the first conductive strip 206, e.g., copper.

In the preferred embodiment, the intermediate conductor 208 has a circular shape. However, any member for connecting the first and second conductive strips 206 and 214 to each other may be used as the intermediate conductor 208 alternatively. The feeding conductor 216 includes a flat flange 218 and a sleeve 220 extending downward from the bottom surface of the flange 218. Since the structure of the feeding conductor 216 is similar to that shown in FIG. 3, it will not be described in detail. Upon assembling the antenna, the first helical element 202, the intermediate conductor 208, the second helical element 210, and the feeding conductor 216 are stuck fast to each other sequentially, and a plastic antenna cover is placed over all of the antenna components.

Figure 12:
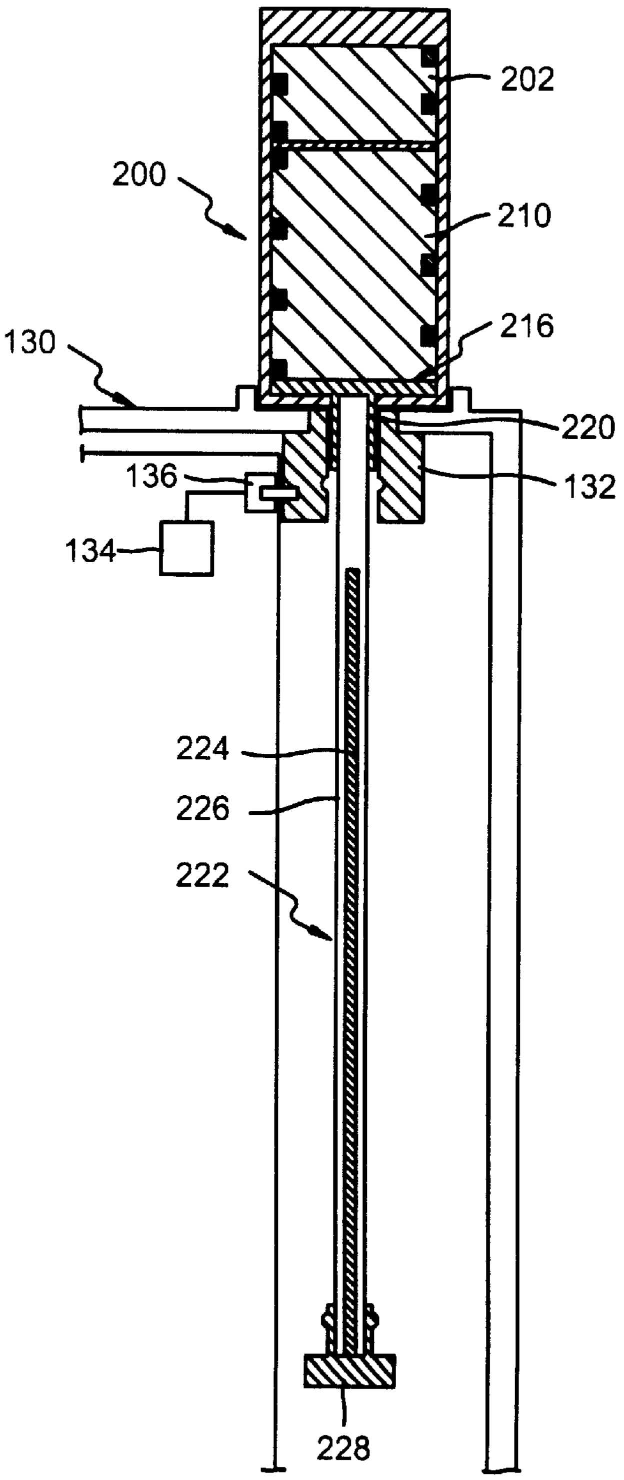
FIG. 12 is a cross-sectional view illustrating an antenna assembly, in a retracted position, which employs the helical antenna of FIG. 11.
Figure 13:
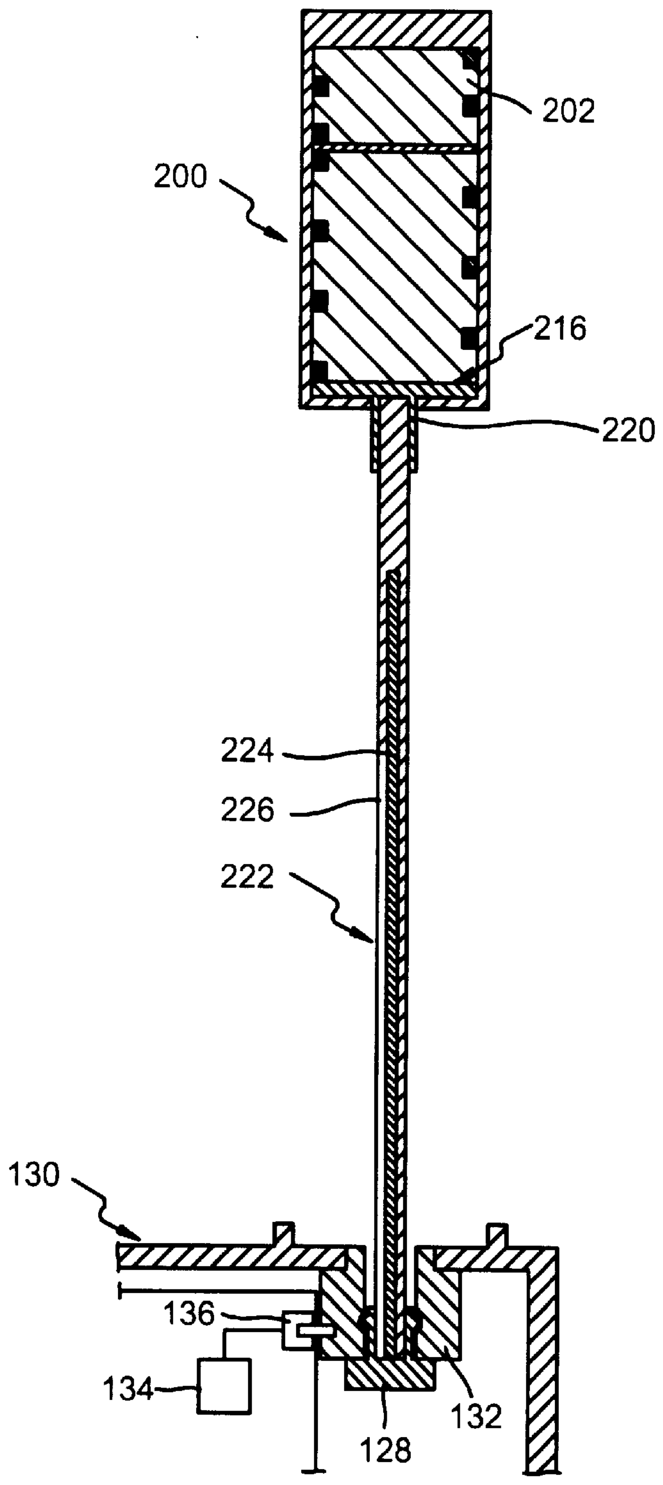
FIG. 13 is a cross-sectional view illustrating an antenna assembly, in an extended position, which employs the helical antenna of FIG. 11.

FIGS. 12 and 13 illustrate an example of an antenna assembly including the helical antenna of FIG. 11 which is installed in a portable phone. The antenna assembly shown in FIGS. 12 and 13 includes a helical antenna 200 and a whip antenna 222. The whip antenna 222 includes an antenna rod 224 operating as a monopole antenna, an antenna cover 226 made of nonconductive plastic material and enclosing the antenna rod 224 to protect it from the external contact or impact, and a conductive stopper 228 attached to the bottom end of the antenna rod 224. In a preferred embodiment, the antenna rod 224 and the stopper 228 are electrically connected to each other. The electrical length of the whip antenna 222 is determined by a lower one of the frequencies $f_1$ and $f_2$. For example, in case that the frequency $f_2$ is lower than the frequency $f_1$, the length of the antenna rod 224 will be $\lambda_2/4$. Assuming that $f_2$ is the frequency of a cellular phone and $f_2$ is the frequency of a PCS phone, the frequency $f_1$ is about double the frequency $f_2$. Therefore, the whip antenna 222 having a length of $\lambda_2/4$ is operable at both the frequencies $f_1$ and $f_2$.

The helical antenna 200 and the whip antenna 222 are installed onto the phone as follows. First, the helical antenna 200 is connected to the upper end of the whip antenna 222 by forcibly fitting the sleeve 220 of the feeding conductor 216 on the upper end of the whip antenna 222. On the other hand, an aperture is formed through the upper portion of the housing 130 of the phone, and a ring-shaped connector 132 for electrically connecting the antenna assembly to the signal processing circuit 134 of the phone is installed inside the aperture. The antenna assembly is installed to provide upward and downward movement inside the aperture penetrating the center of the connecter 132. Meanwhile, in order to ensure the electrical contact of the sleeve 220 and the connector 132 in a retracted position, a snap-in protrusion and a snap-in recess are formed on the outer surface of the stopper 228 and the inner surface of the connector 132, respectively. Alternatively, a plate spring may be additionally installed on the inner side of the connector 132 instead of the snap-in recess and the snap-in protrusion.

The antenna assembly of FIGS. 12 and 13 operates as follows. When the antenna assembly is in its retracted position as shown in FIG. 12, the stopper 228 is electrically isolated from the connector 132 so that no signal is transferred between the signal processing circuit 134 and the whip antenna 222. Therefore, the whip antenna 222 has no effect on the antenna characteristics in such a position. At this time, however, the helical antenna 200 can exchange signals with the signal processing circuit 134 since the sleeve 220 of the feeding conductor 216 is electrically connected to the connector 132.

Thus, the power from the signal processing circuit 134 is provided to the helical antenna 200 via the antenna clip 136, the connector 132, and the feeding conductor 216 and is radiated as a radio wave. Here, the radio wave is substantially radiated by the first helical element 202 if the signal is modulated in the frequency $f_1$, while being substantially radiated by the second helical element 210 if the signal is modulated in the frequency $f_2$. As for signal reception, a RF signal having the frequency $f_1$ is substantially received by the first helical element 202 and transferred to the signal processing circuit 134 via the feeding conductor 216, the connector 132, and the antenna clip 136. Also, a RF signal having the frequency $f_2$ is substantially received by the second helical element 222 and transferred to the signal processing circuit 134. Therefore, only one of the first and second helical elements 202 and 222 substantially operates depending on the frequency processed by the signal processing circuit 134.

When the antenna assembly is in its extended position as shown in FIG. 13, the sleeve 220 of the feeding conductor 216 is isolated from the connector 132, so that the helical antenna 200 is prevented from transmitting or receiving signals. Accordingly, only the whip antenna 120 is operable as a monopole antenna in this operating mode. The power from the signal processing circuit 134 of the phone is provided to the whip antenna 222 and is radiated as a radio wave. Also, the RF signal received by the whip antenna 222 is provided to the signal processing circuit 134 via the stopper 228, the connector 132, and the antenna clip 136.

Meanwhile, in an alternative embodiment of the helical antenna of FIG. 11, the sleeve 220 may not be provided to the feeding conductor 216. In such an embodiment, the connector 132 is manufactured so that its upper area facing the flange 218 of the feeding conductor is sufficiently wide. Accordingly, when the antenna assembly is in its retracted position as shown in FIG. 12, signals are transferred between the flange 218 of the helical antenna and the connector 132 through electromagnetic coupling.

According to the helical antenna of FIG. 11, a single helical antenna 200 can operate at two different frequencies. Therefore, it will be enough, for a portable phone manufacturing company producing different kinds of phones each of which operate at different frequencies, to be equipped with a single kind of antenna to assemble the two kinds of phones instead of purchasing both kinds of antennas.

Figure 14:
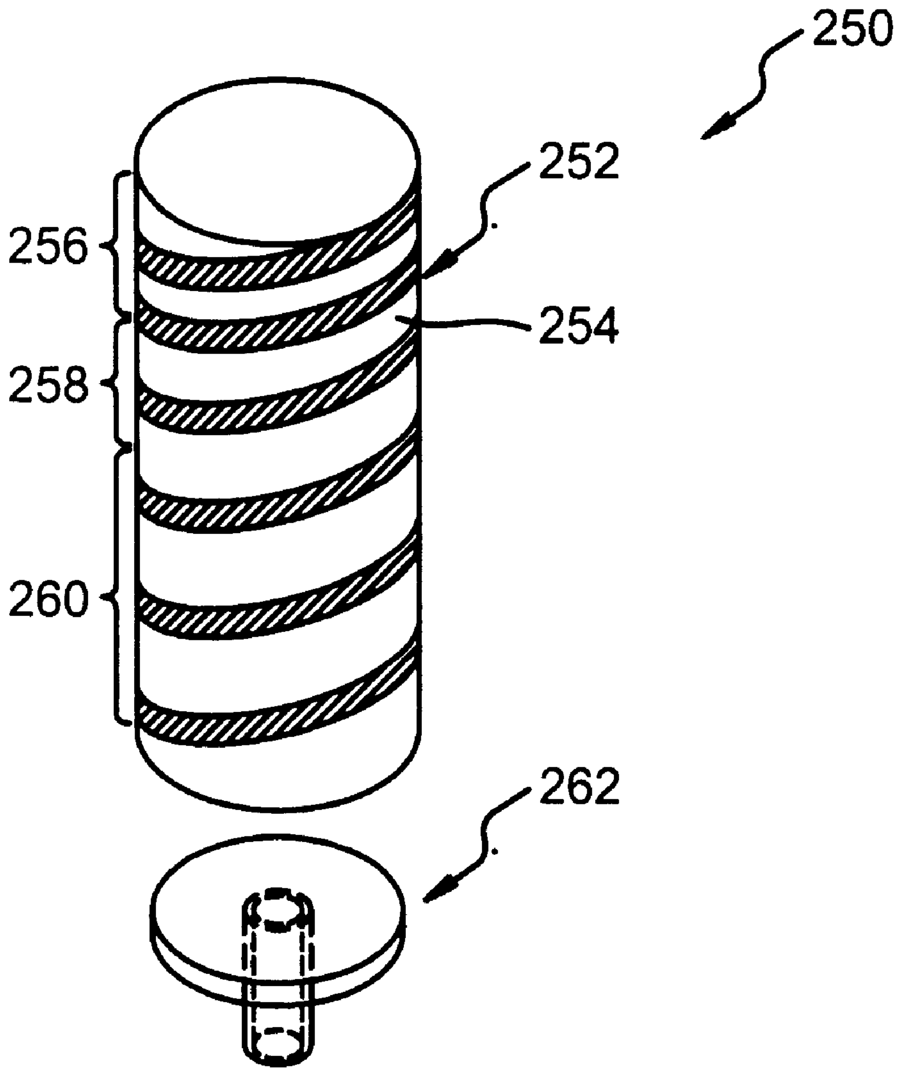
FIG. 14 is an exploded perspective view illustrating yet another embodiment of the helical antenna according to the present invention, which operates as a dual band antenna.

FIG. 14 illustrates another embodiment of the helical antenna according to the present invention. A helical antenna 250, which is a dual band antenna, has a structure in which one dielectric is plated with two conductive strips each of which operates as a helical antenna. Thus, the helical antenna 250 can be employed to either a portable phone operating at a frequency $f_1$ or a phone operating at another frequency $f_2$ without any structural modification.

The helical antenna 250 includes a helical element 252, a feeding conductor 262, and a not shown antenna cover. The helical element 252 comprises a dielectric core 254 and first through third conductive strips 256, 258, and 260 formed on the dielectric core 254. A spiral groove, of which pitch changes at least twice while proceeding from its top end to its bottom end, is formed on the outer circumferential surface of the dielectric core 254, and the first through the third conductive strips 256, 258, and 260 are formed in series in the groove of the dielectric core 254. The first conductive strip 256 has an electrical length of $\lambda_1/4$ to have an operating frequency of $f_1$ and the third conductive strip 260 has an electrical length of $\lambda_2/4$ to have an operating frequency of $f_2$. The second conductive strip 258 is provided as a transition interval for an impedance-matching between the first and third conductive strips 256 and 260. The pitches and widths of the first through third conductive strips 256, 258 and 260 are determined so as to provide optimal radiation and reception characteristics at the frequencies $f_1$ and $f_2$ and accomplish impedance matching as completely as possible.

Figure 15:
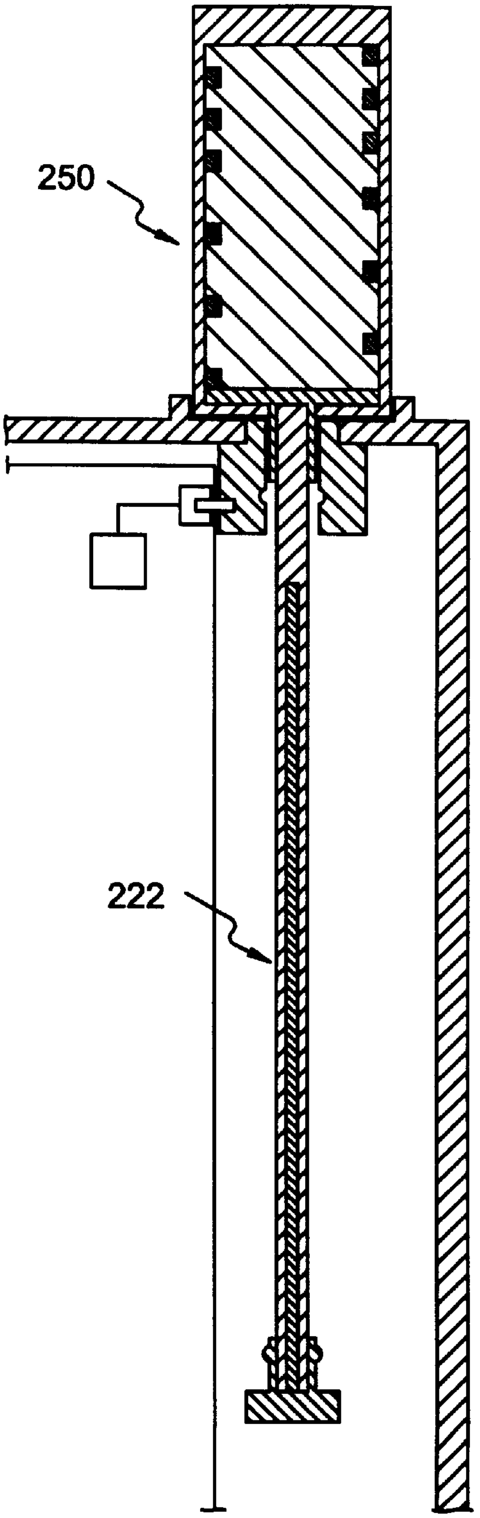
FIG. 15 is a cross-sectional view illustrating an antenna assembly, in a retracted position, which employs the helical antenna of FIG. 14.
Figure 16:
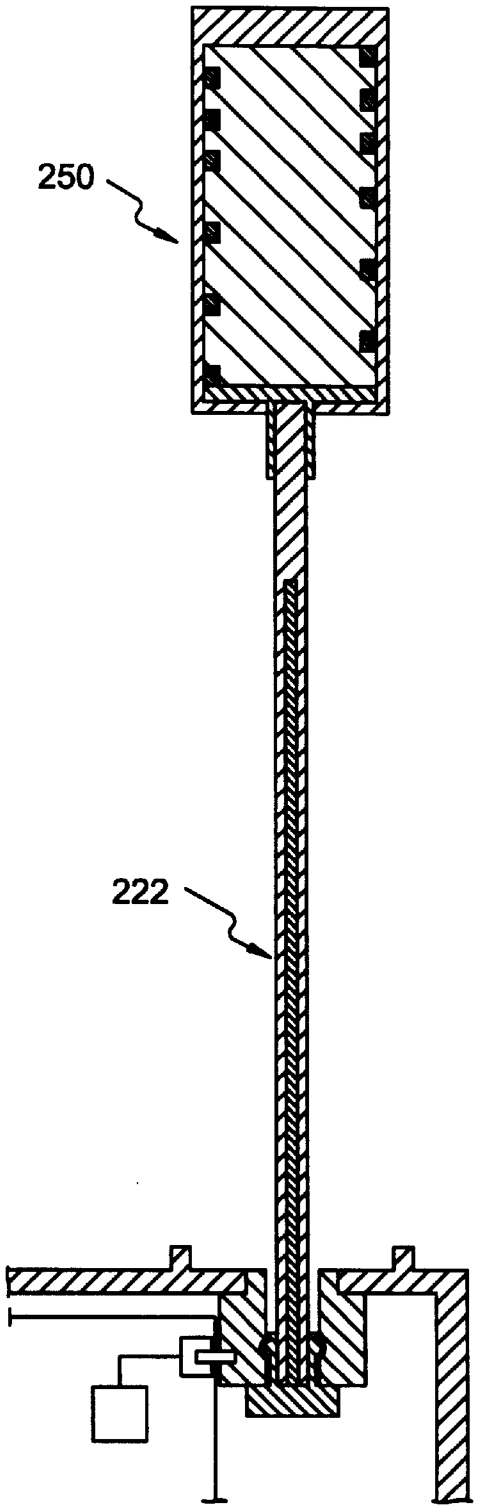
FIG. 16 is a cross-sectional view illustrating an antenna assembly, in an extended position, which employs the helical antenna of FIG. 14.

FIGS. 15 and 16 illustrate an example of an antenna assembly including the helical antenna of FIG. 14 which is installed in a portable phone. The installation and operation of the antenna assembly shown in FIGS. 15 and 16 are similar to those of the antenna assembly of FIGS. 12 and 13, and therefore detailed description thereof is omitted.

Figure 17:
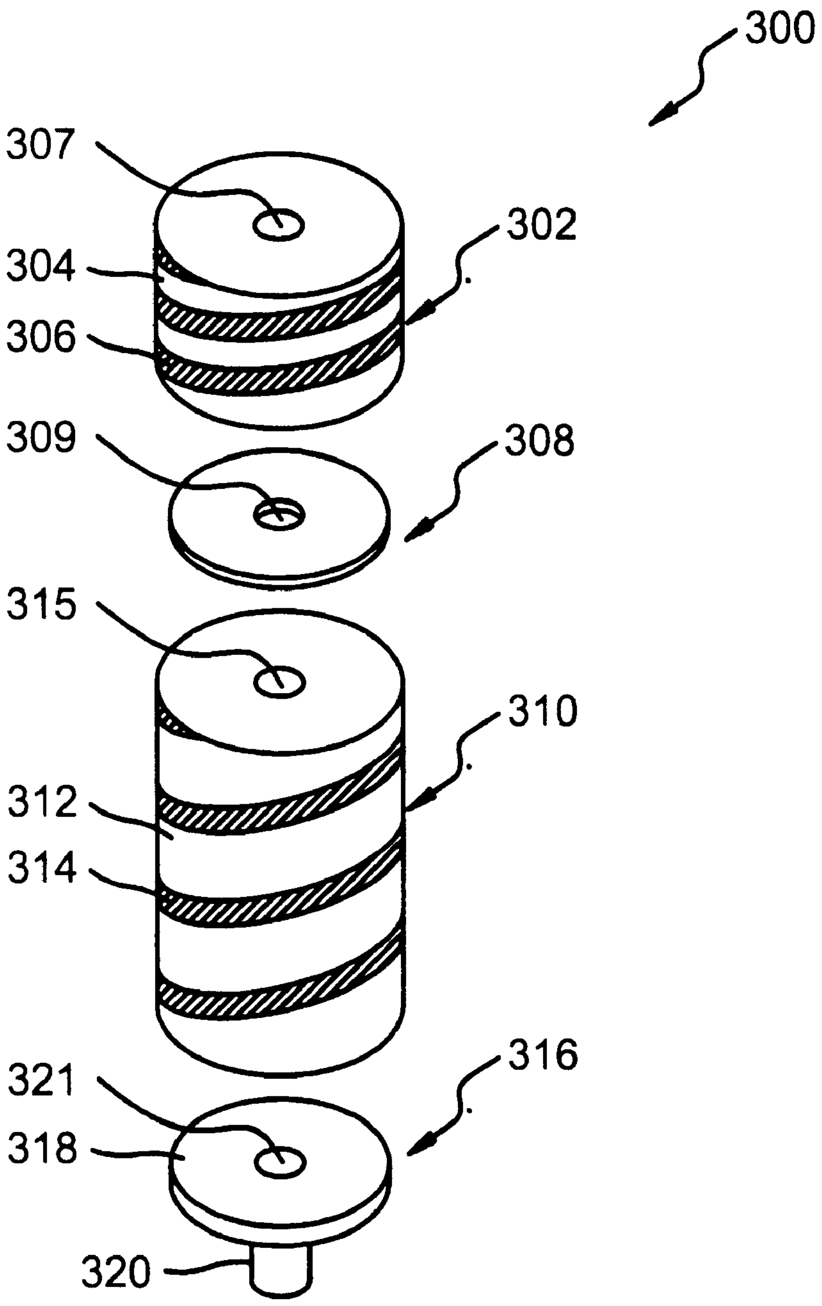
FIG. 17 is an exploded perspective view illustrating yet another embodiment of the helical antenna according to the present invention, which operates as a dual band antenna.

FIG. 17 illustrates another embodiment of the helical antenna according to the present invention. The helical antenna shown in FIG. 17, which is a dual band antenna, has a structure similar to that of FIG. 11. The helical antenna 300 includes a first and second helical elements 302 and 310, an intermediate conductor 308, a feeding conductor 316, and an antenna cover (not shown). The intermediate conductor 308 electrically connects the first and second helical elements 302 and 310 to each other. The feeding conductor 316 provides an electrical connection between the signal processing circuit in the phone and the first and second helical elements 302 and 310.

The first helical element 302 includes a first dielectric core 304 and a first conductive strip 306 formed on the first dielectric core 304. Also, the second helical element 310 includes a second dielectric core 312 and a second conductive strip 314 formed on the second dielectric core 312. Apertures 307, 309, 315, and 321 of which diameters are almost the same as the inner diameter of the sleeve 320 are provided passing through the axes of the first helical element 302, the intermediate conductor 308, the second helical element 310, and the feeding conductor 316, respectively.

Figure 18:
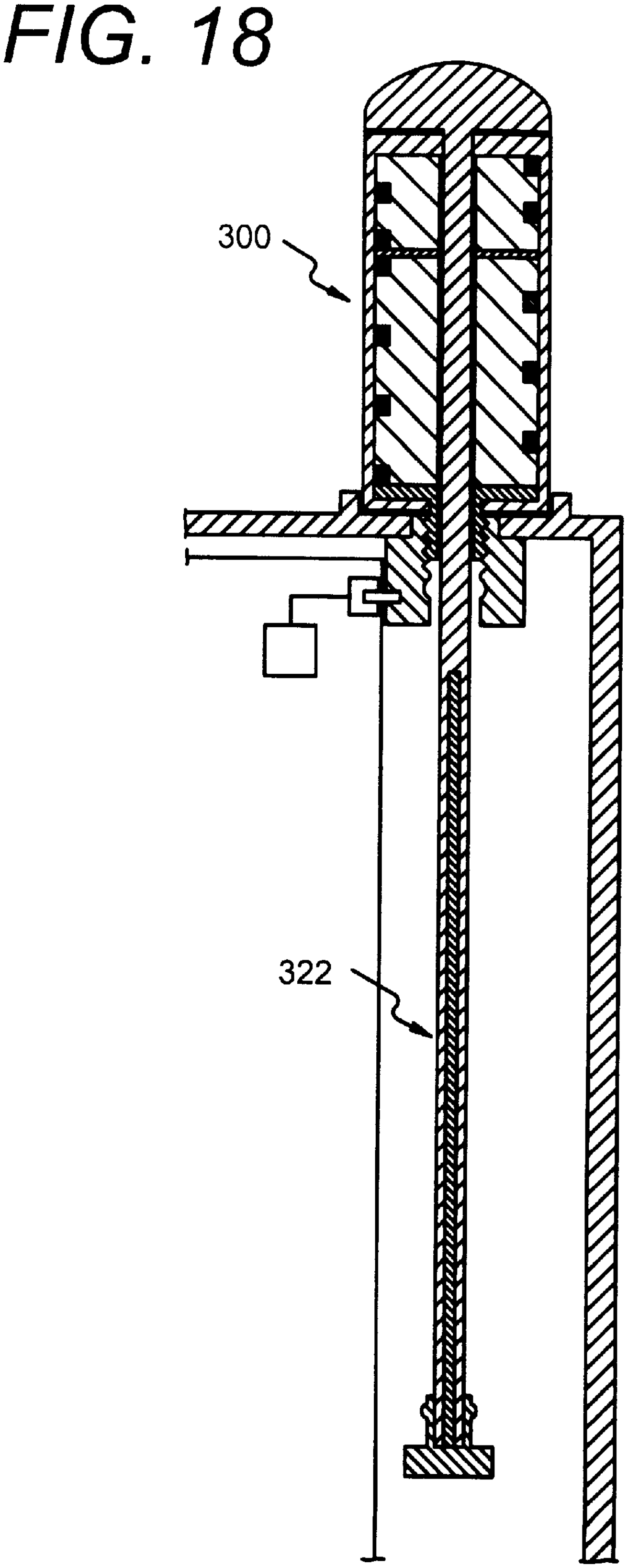
FIG. 18 is a cross-sectional view illustrating an antenna assembly, in a retracted position, which employs the helical antenna of FIG. 17.
Figure 19:
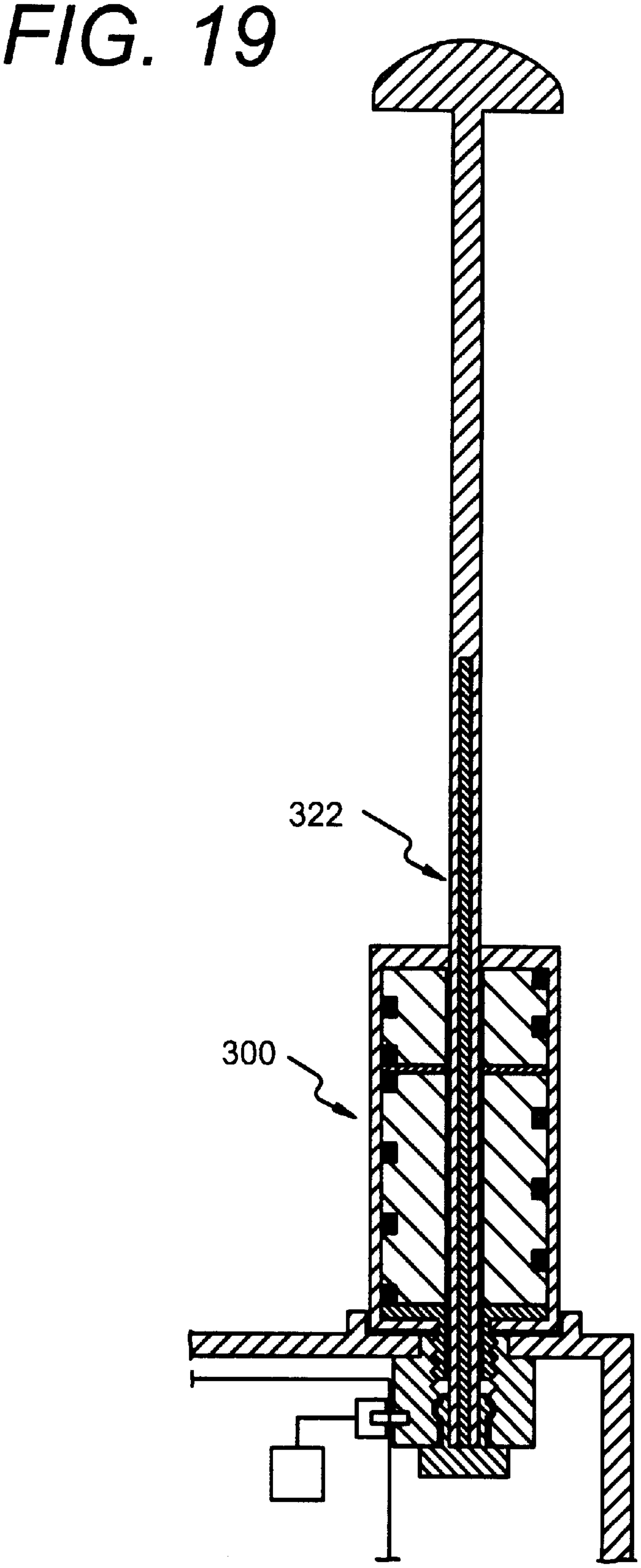
FIG. 19 is a cross-sectional view illustrating an antenna assembly, in an extended position, which employs the helical antenna of FIG. 17.

FIGS. 18 and 19 illustrate an example of an antenna assembly including the helical antenna of FIG. 17 which is installed in a portable phone. The installation and operation of the antenna assembly shown in FIGS. 15 and 16 are similar to those of the antenna assembly of FIGS. 9 and 10, and therefore detailed description thereof is omitted.

Figure 20:
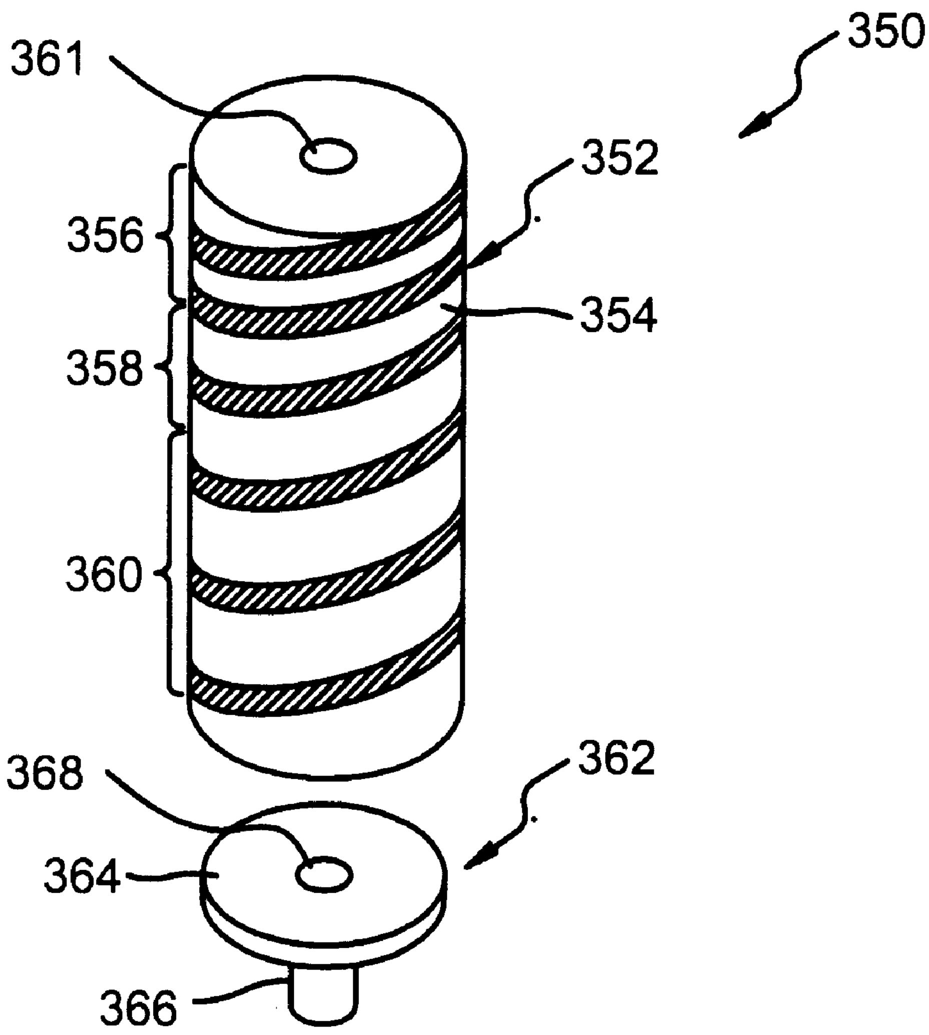
FIG. 20 is an exploded perspective view illustrating yet another embodiment of the helical antenna according to the present invention, which operates as a dual band antenna.

FIG. 20 illustrates another embodiment of the helical antenna according to the present invention. The helical antenna shown in FIG. 20, which is a dual band antenna, has a structure similar to that of FIG. 14. The helical antenna 350 includes a helical element 352, a feeding conductor 362, and a not shown antenna cover. The helical element 352 comprises a dielectric core 354 and first through third conductive strips 356, 358, and 360 formed on the dielectric core 354. A spiral groove is formed on the outer circumferential surface of the dielectric core 354, and the first through the third conductive strips 356, 358, and 360 are formed in series in the groove of the dielectric core 354. Apertures 361 and 368 of which diameters are almost the same as the inner diameter of the sleeve 366 are provided passing through the center of the helical element 352 and the feeding conductor 362, respectively. The helical antenna of FIG. 20 is installed and operates similarly to that of FIG. 17.

Figure 21:
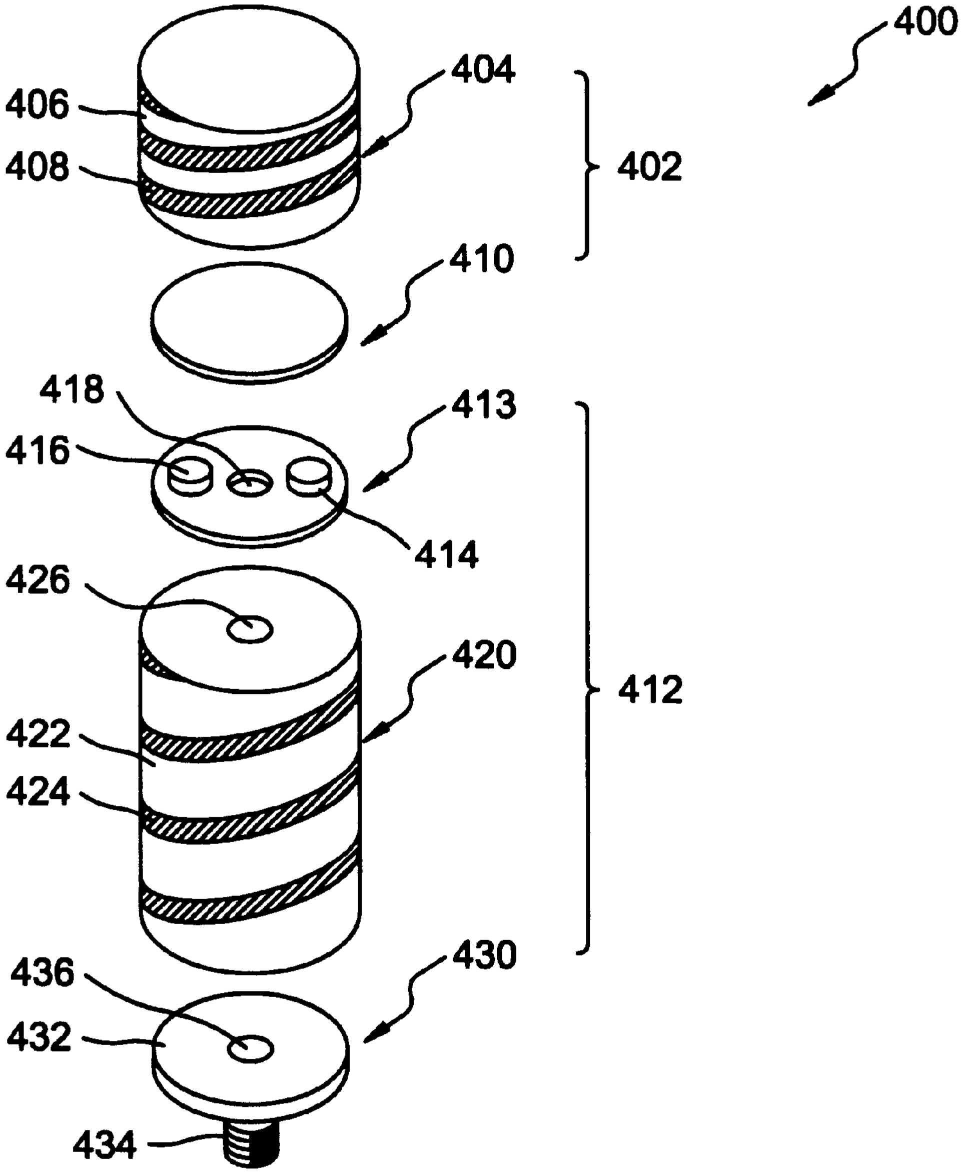
FIG. 21 is an exploded perspective view illustrating yet another embodiment of the helical antenna according to the present invention, which operates as a dual band antenna.

FIG. 21 illustrates another embodiment of the helical antenna according to the present invention. The helical antenna 400 of FIG. 21, which is a dual band antenna capable of operating in two different frequency bands, comprises two unit helical antennas: a first helical antenna 402 and a second helical antenna 412.

The first helical antenna 402 includes a first helical element 404 and a first fitting conductor 410. The first helical element 404 includes a first dielectric core 406 and a first conductive strip 408 formed on the first dielectric core 406. The first dielectric core 406 has a cylindrical shape and a spiral groove is formed on the outer circumferential surface thereof. The first conductive strip 408 is formed by plating or coating the groove of the first dielectric core 406 with copper, and has an electrical length of $\lambda_1/4$. Meanwhile, the first fitting conductor 410 has a circular shape.

The second helical antenna 412 includes a second fitting conductor 413, a second helical element 420, and a feeding conductor 430. The second fitting conductor 413 has a circular shape and has two protrusions 414 and 416 thereon. The second helical element 420 includes a second dielectric core 422 and a second conductive strip 424 formed on the second dielectric core 422. The second dielectric core 422 has a cylindrical shape and a spiral groove is formed on the outer circumferential surface thereof. The second conductive strip 424 is formed by plating or coating the groove of the second dielectric core 422 with copper, and has an electrical length of $\lambda_2/4$. Meanwhile, the feeding conductor 430 includes a flat flange 432 and a sleeve 434 extending downward from the bottom surface of the flange 432. A screw thread is formed on the outer circumferential surface of the sleeve 434. Apertures 418, 426, and 436 of which diameters are substantially the same as the inner diameter of the sleeve 434 are provided passing through the axes of the second fitting conductor 413, the second dielectric core 422, and the flange 432, respectively.

Figure 22:
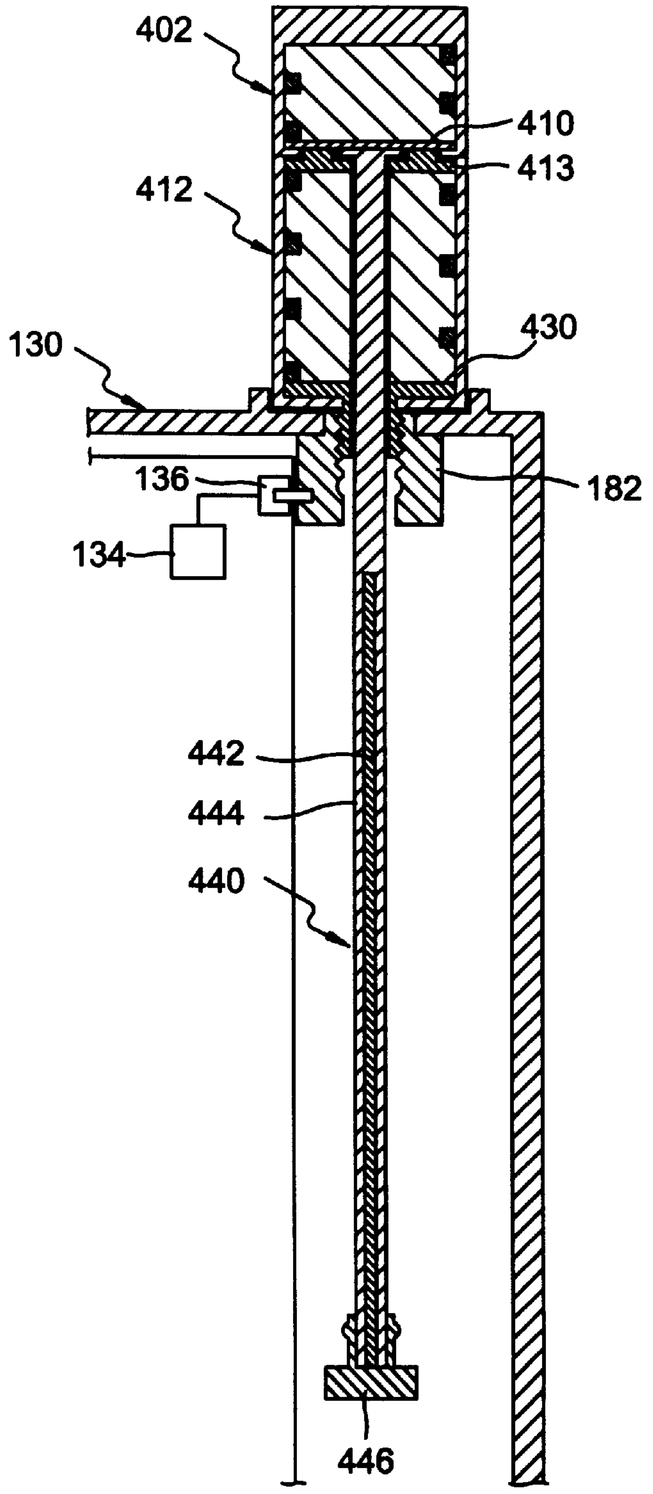
FIG. 22 is a cross-sectional view illustrating an antenna assembly, in a retracted position, which employs the helical antenna of FIG. 21.
Figure 23:
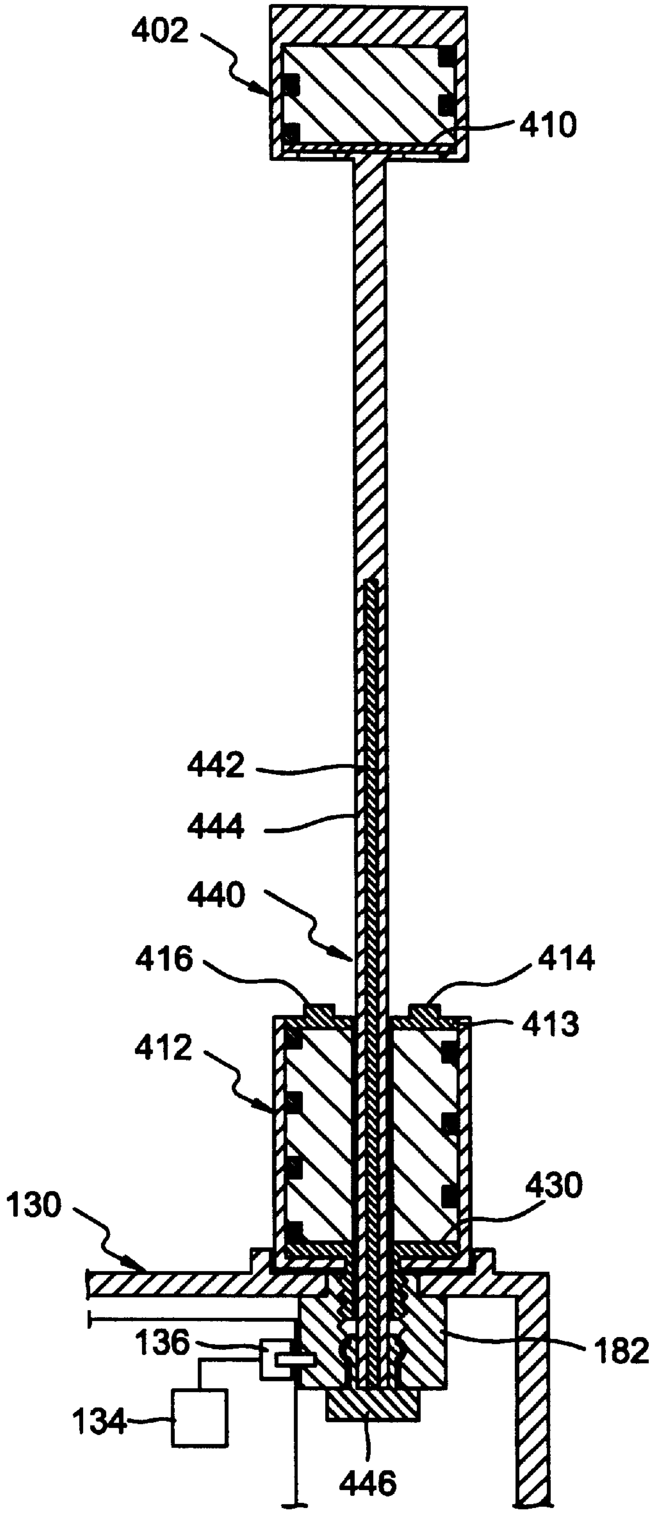
FIG. 23 is a cross-sectional view illustrating an antenna assembly, in an extended position, which employs the helical antenna of FIG. 21.

FIGS. 22 and 23 illustrate an example of an antenna assembly including the helical antenna of FIG. 21 which is installed in a portable phone. The antenna assembly shown in FIGS. 22 and 23 includes two helical antennas 402 and 412 and a whip antenna 440. The whip antenna 440 includes an antenna rod 442 operating as a monopole antenna, an antenna cover 444 made of nonconductive plastic material and enclosing the antenna rod 442 to protect it from the external contact or impact, and a conductive stopper 446 attached to the bottom end of the antenna rod 442. The electrical length of the whip antenna 440 is determined by a lower one of the frequencies $f_1$ and $f_2$. For example, in case that the frequency $f_2$ is lower than the frequency $f_2$, the length of the antenna rod 442 will be $\lambda_2/4$.

The helical antennas 402 and 412 and the whip antenna 440 are installed onto the phone as follows. First, the first helical antenna 402 is installed at the upper end of the whip antenna 440 in a state that the first dielectric core 406 is stuck to the first fitting conductor 410. At this time, the antenna cover 444 of the whip antenna encloses the antenna rod 442 as well as the first helical antenna 402. Accordingly, the first helical antenna 402 and the whip antenna 440 are incorporated into a single body in the present embodiment. Two apertures are formed through the antenna cover 444 beneath the first fitting conductor 410 correspondingly to the protrusions 414 and 416 of the second fitting conductor 413, so that the first fitting conductor 410 can selectively contact the protrusions 414 and 416. Also, the whip antenna 440 is installed to provide upward and downward movement inside the aperture 426 penetrating the second dielectric core 422.

Meanwhile, an aperture is formed through the upper portion of the housing 130 of the phone, and a ring-shaped connector 182 for electrically connecting the antenna assembly to the signal processing circuit in the phone is installed inside the aperture. Also, the inner circumferential surface of the connector 182 is threaded so as to engage the second helical antenna 420. The connector 182 can be forcibly fit into the aperture or mounted by use of an adhesive. Alternatively, threaded patterns may be formed on the inner wall of the aperture of the housing and the outer circumferential surface of the connector 182, so that the two threaded patterns engage each other. The second helical antenna 420 is installed on and fixed to the phone by engaging the threaded pattern of the sleeve 434 and that of the connector 182.

The antenna assembly of FIGS. 22 and 23 operates as follows. In the present embodiment, the first helical antenna 402 works as a knob. Thus, a user of the phone may extend the first helical antenna 402 and the whip antenna 440 by pulling the first helical antenna 402 upward, or retract the first helical antenna 402 and the whip antenna 440 by pushing the first helical antenna 402 downward.

When the first helical antenna 402 and the whip antenna 440 are in their retracted position as shown in FIG. 22, the stopper 446 is electrically isolated from the connector 182 so that no signal is transferred between the signal processing circuit 134 and the whip antenna 440. Therefore, the whip antenna 440 has no effect on the antenna characteristics in such a position. The power from the signal processing circuit 134 is provided to the second helical antenna 420 via the antenna clip 136 and the connector 182 and is radiated as a radio wave. Also, some of the power supplied to the second helical antenna 420 is provided to the first helical antenna 402 since the first fitting conductor 410 contacts the protrusions 414 and 416 of the second fitting conductor 413.

Thus, both the first and the second helical antennas 402 and 420 are operable when the antenna is in its retracted position. At this time, the radio wave is substantially radiated by the first helical antenna 402 if the signal is modulated in the frequency $f_1$, while being substantially radiated by the second helical antenna 420 if the signal is modulated in the frequency $f_2$. As for signal reception, a RF signal having the frequency $f_1$ is substantially received by the first helical antenna 402 and transferred to the signal processing circuit 134 via the feeding conductor 430, the connector 182, and the antenna clip 136. Also, a RF signal having the frequency $f_2$ is substantially received by the second helical antenna 420 and transferred to the signal processing circuit 134. Therefore, only one of the first and second helical antennas 402 and 420 substantially operates depending on the frequency processed by the signal processing circuit 134.

When the first helical antenna 402 and the whip antenna 440 are in their extended position as shown in FIG. 23, the whip antenna 440 is operable since the stopper 446 of the whip antenna 440 contacts the connector 182. However, the first helical antenna 402 is electrically isolated from the signal processing circuit 134 since the first fitting conductor 410 is disconnected from the protrusions 414 and 416 of the second fitting conductor 413. Thus, when the antenna is in its extended position, the second helical antenna 420 and whip antenna 440 are operable while the first helical antenna 402 is not. At this time, the whip antenna 440 mainly operates as a monopole antenna to transmit and receive signals, and the second helical antenna 420 is operable as an accessory of the whip antenna 440.

In an alternative embodiment of the antenna of FIG. 21, the first fitting conductor 410 of the first helical antenna 402 may comprise a sleeve extending downward from the bottom surface of the first fitting conductor 410, so that the first helical antenna 402 and the whip antenna 440 may be enclosed by separate antenna covers. In such a case, the first helical antenna 402 can be combined to the top end of the whip antenna 440 by forcibly fitting to the top end of the whip antenna 440 into the provided sleeve.

Figure 24:
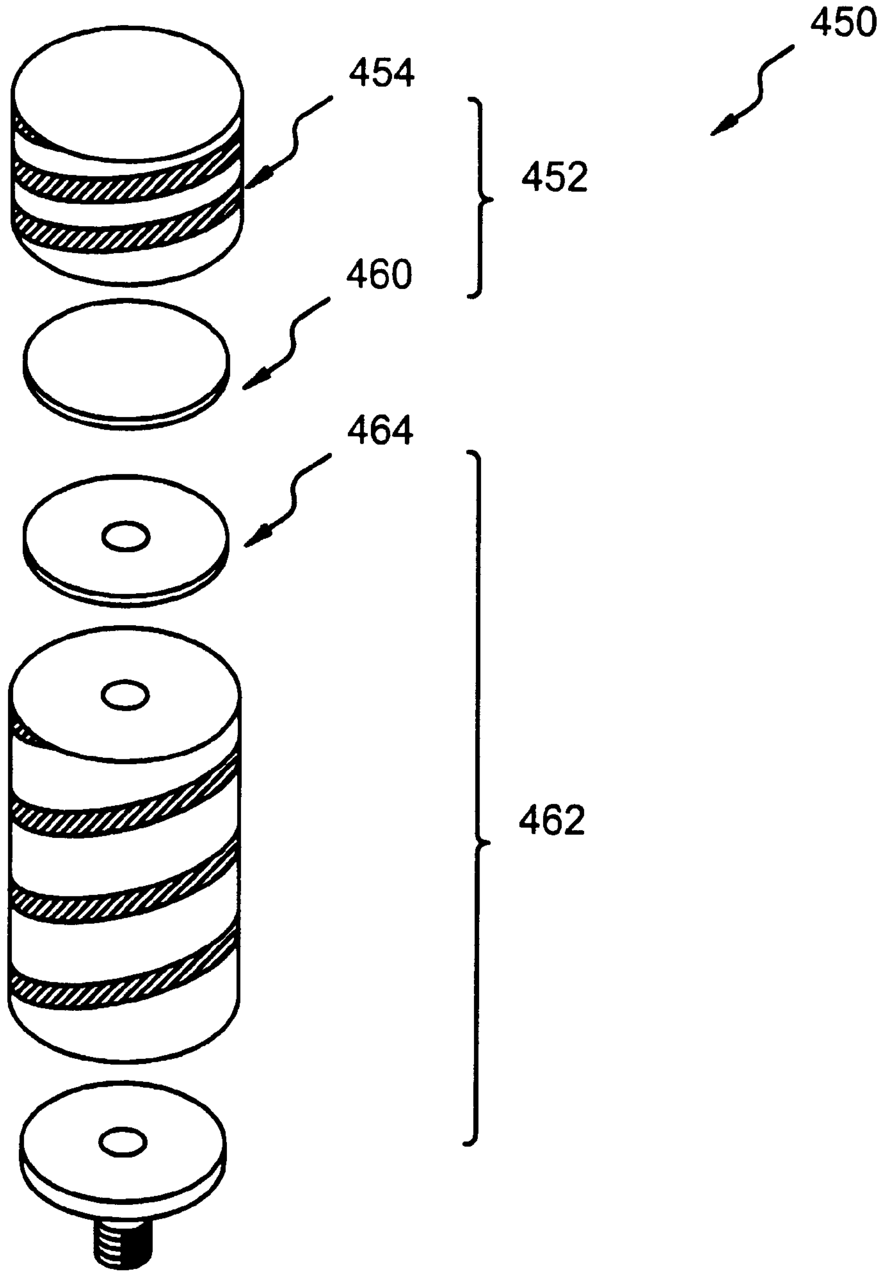
FIG. 24 is an exploded perspective view illustrating yet another embodiment of the helical antenna according to the present invention, which operates as a dual band antenna.
Figure 25:
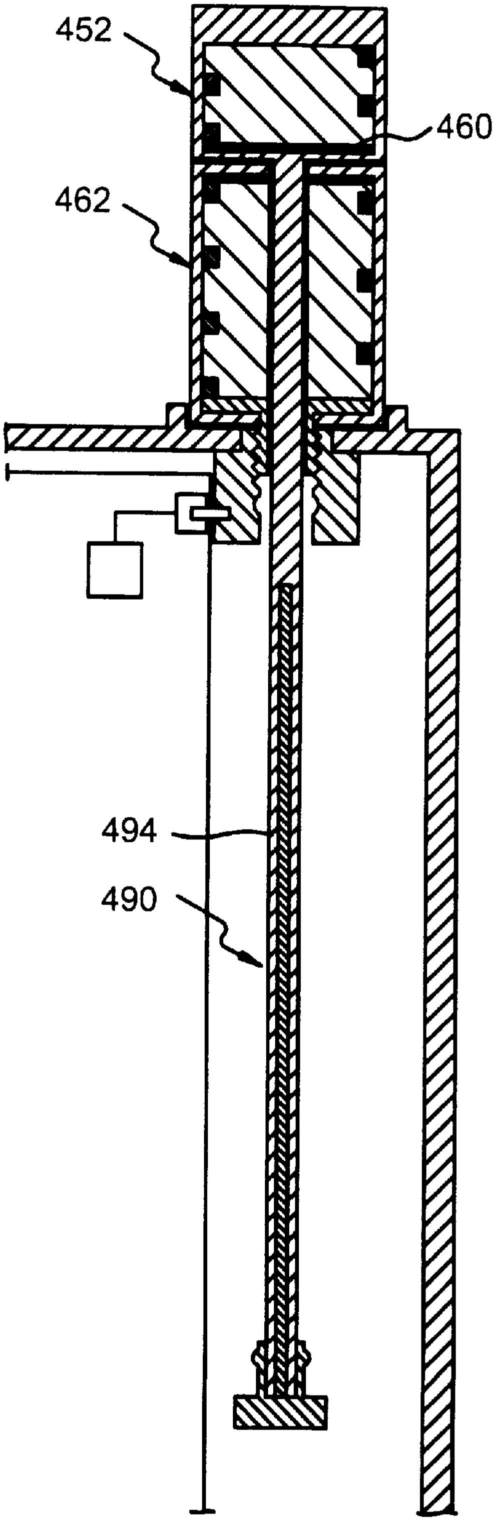
FIG. 25 is a cross-sectional view illustrating an antenna assembly, in a retracted position, which employs the helical antenna of FIG. 24.
Figure 26:
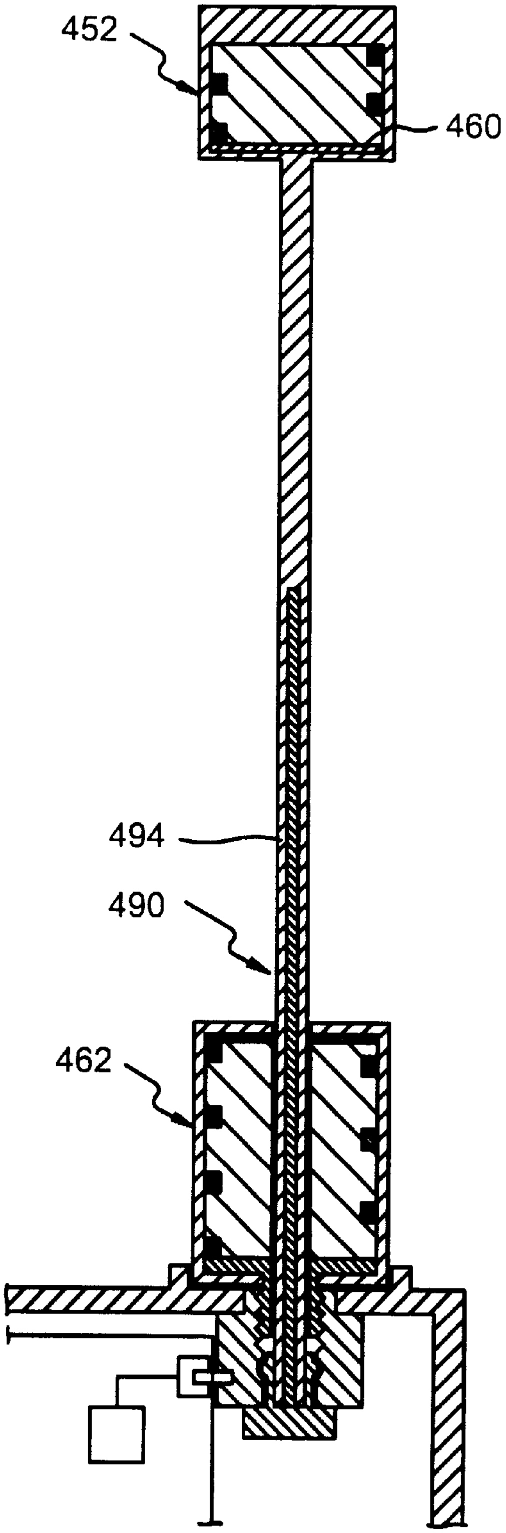
FIG. 26 is a cross-sectional view illustrating an antenna assembly, in an extended position, which employs the helical antenna of FIG. 24.

FIG. 24 illustrates another embodiment of the helical antenna according to the present invention and FIGS. 25 and 26 illustrate an example of an antenna assembly including the helical antenna of FIG. 24 which is installed in a portable phone. The helical antenna 450 of FIG. 24 has a similar configuration with that shown in FIG. 21. However, the second fitting conductor 464 does not comprise protrusions thereon, and corresponding holes are not formed through the antenna cover beneath the first fitting conductor 460. Accordingly, any direct contact cannot be established between the first and second helical antennas 452 and 462. Nevertheless, signal may be transmitted between the first and second helical antennas 452 and 462 through electromagnetic coupling in this operation mode.

Although the present invention has been described in detail above, it should be understood that the foregoing description is illustrative and not restrictive. Those of ordinary skill in the art will appreciate that many obvious modifications can be made to the invention without departing from its spirit or essential characteristics. For example, the dielectric core may be implemented by use of a plastic such as polycarbonate or polyvinyl chloride (PVC) rather than the ceramic. The dielectric core may have a trapezoidal shape rather than the cylindrical shape. Also, nickel or silver can be used for the conductive strip instead of copper. Further, the shape of the feeding conductor enclosed together with the dielectric core by the antenna cover can be variously modified according to the method of installing the helical antenna. Accordingly, the scope of the invention should be interpreted in the light of the following appended claims.

What is claimed is:

1. A dual band helical antenna comprising:

a first dielectric core having a substantially cylindrical shape with an outer circumferential surface on which a first spiral groove is formed;

a first conductive strip deposited on the first spiral groove and having a length of one-fourth of a first wavelength;

a second dielectric core, positioned under said first dielectric core, having a substantially cylindrical shape with an outer circumferential surface on which a second spiral groove is formed;

a second conductive strip deposited on the groove of said second dielectric core, electrically connected to said first conductive strip, and having a length of one-fourth of a second wavelength;

a feeding conductor, placed under said second dielectric core, for providing an electrical connection between said second conductive strip and an external circuit; and an antenna cover for enclosing said first and said second dielectric cores and said feeding conductor.

2. The dual band helical antenna as claimed in claim 1, further comprising:

an intermediate conductor, positioned between said first and said second dielectric cores, for electrically connecting said first and said second conductive strips to each other.

3. The dual band helical antenna as claimed in claim 1, wherein said first and said second dielectric cores are incorporated into a single dielectric body, said single dielectric body having a substantially cylindrical shape with an outer circumferential surface on which the first and the second spiral grooves are formed, and said helical antenna further comprises a third conductive strip, positioned between said first and said second conductive strips, for electrically connecting said first and said second conductive strips to each other and providing an impedance matching.

4. The dual band helical antenna as claimed in claim 1, wherein said feeding conductor comprises:

a flange having a top surface and a bottom surface, wherein the top surface contacting said second conductive strip at the bottom end of said second dielectric core; and a sleeve extending downward from the bottom surface of said flange.

5. The dual band helical antenna as claimed in claim 1, wherein said first dielectric core is penetrated by a first aperture passing axially through said first dielectric core, and said second dielectric core is penetrated by a second aperture passing axially through said second dielectric core, the first aperture having the same diameter as the second aperture.

* * * * *